United States Patent [19]
Malson

[11] Patent Number: 5,910,175
[45] Date of Patent: *Jun. 8, 1999

[54] CLOSED-LOOP ADAPTIVE FUZZY LOGIC HYDRAULIC PRESSURE CONTROL FOR AN AUTOMATIC TRANSMISSION

[75] Inventor: Steven George Malson, Dearborn Heights, Mich.

[73] Assignee: Ford Global Technologies, Inc., Dearborn, Mich.

[*] Notice: This patent is subject to a terminal disclaimer.

[21] Appl. No.: 08/835,163

[22] Filed: Apr. 7, 1997

[51] Int. Cl.⁶ .............................. G06F 17/00; G06F 19/00
[52] U.S. Cl. ............................. 701/57; 701/58; 701/51; 701/84; 477/148; 477/156
[58] Field of Search .................................. 701/27, 44, 51, 701/57, 58, 83, 84, 90; 477/121, 125, 143, 148, 156, 169, 174

[56] References Cited

U.S. PATENT DOCUMENTS

| | | | |
|---|---|---|---|
| 5,323,318 | 6/1994 | Hasegawa et al. | 701/57 |
| 5,389,050 | 2/1995 | Sakai et al. | 701/57 |
| 5,390,117 | 2/1995 | Graf et al. | 701/57 |
| 5,557,521 | 9/1996 | Danz et al. | 701/57 |
| 5,719,768 | 2/1998 | Tashiro et al. | 701/59 |
| 5,743,829 | 4/1998 | Tanizawa et al. | 701/57 |
| 5,794,169 | 8/1998 | Jung et al. | 701/57 |
| 5,799,260 | 8/1998 | Droste et al. | 701/58 |

*Primary Examiner*—William A. Cuchlinski, Jr.
*Assistant Examiner*—Gertrude Arthur
*Attorney, Agent, or Firm*—Frank G. McKenzie

[57] ABSTRACT

A self-organizing fuzzy logic controller develops an adaptive pressure adder that modifies the magnitude of pressure supplied to a friction element of an automatic transmission. The controller uses a turbine speed versus engine torque table in KAM to store the adaptive pressure adder for each shift. Tables in KAM represent fuzzy rules which are altered based on shift performance criteria to produce a self-organizing fuzzy logic controller. The criteria, which define shift performance, include the ratio change slip time and the initial ratio change time divided by the desired slip time (called target ratio). The desired slip time is determined from a calibratable matrix. After a shifting event, an adaptive pressure adjustment is determined for the next shifting event having the same conditions. A two-input (slip time and target ratio) fuzzy logic controller is used to determine the pressure adjustment. The adaptive pressure adjustment from the fuzzy controller is then increased if stage time is greater than a calibratable value. The adaptive pressure is also multiplied by a factor determined from the deviation in the throttle position reading for the shift event. Once the adaptive pressure is calculated, the adjustment is added to the cells of the adaptive pressure matrix that correspond to the turbine speed and engine torque conditions.

12 Claims, 9 Drawing Sheets

| Gear | Fwd. 32 | Interm. 36 | Direct 34 | Rev. Brake 28 | OD Brake 30 | Low-Interm. Brake 26 | Drive 38 | 40 | Coast 154 | 156 |
|---|---|---|---|---|---|---|---|---|---|---|
| 1M | X | | X | | | X | X | | | X |
| 1D | X | | | | | X | X | | O/R | |
| 2 | X | X | | | | X | O/R | | O/R | |
| 3 | X | X | X | | | | | X | X | |
| 4 | | X | X | | X | | O/R | | | O/R |
| R | X | | X | X | | | X | | | X |

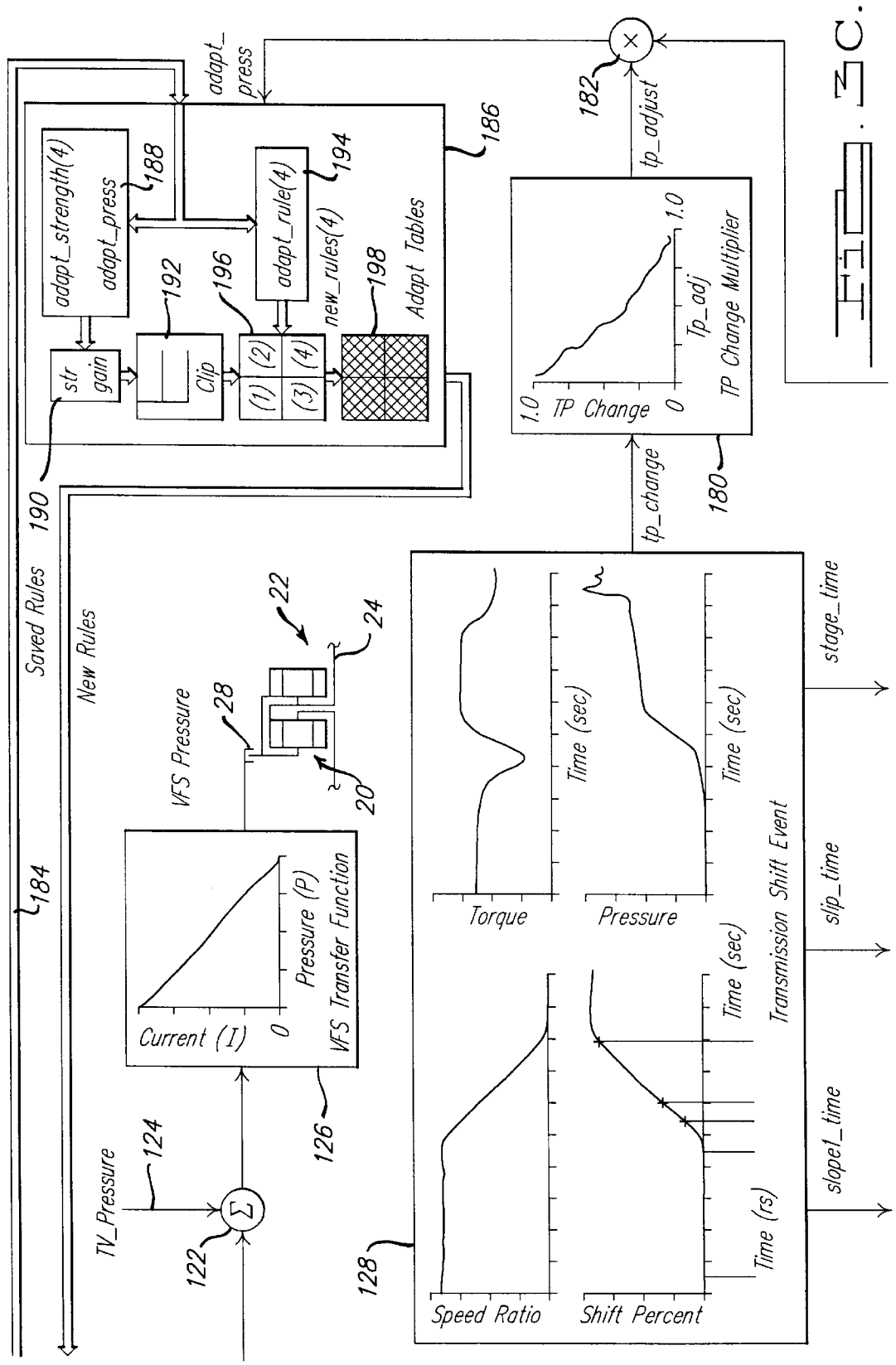

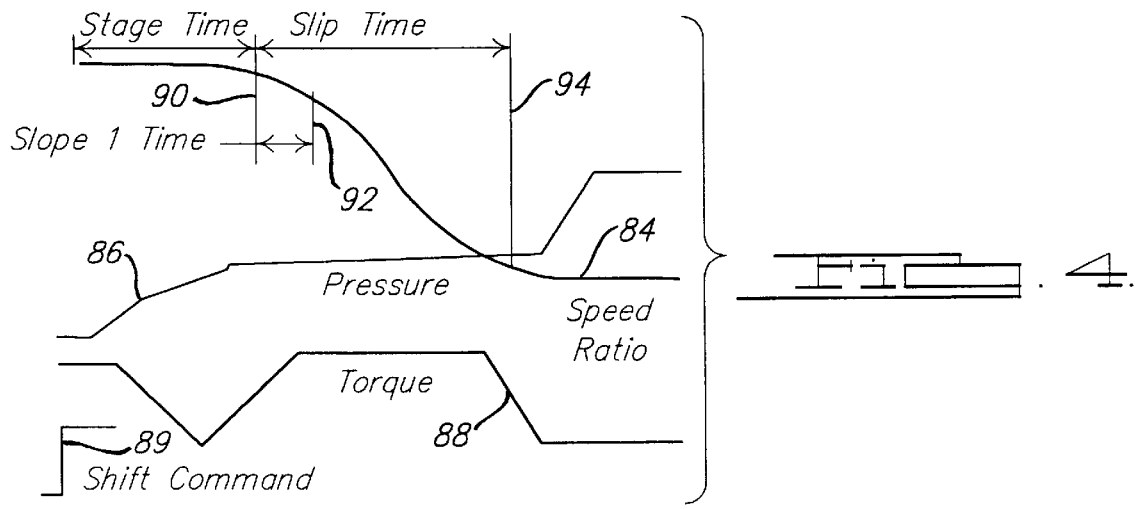
FIG. 4.
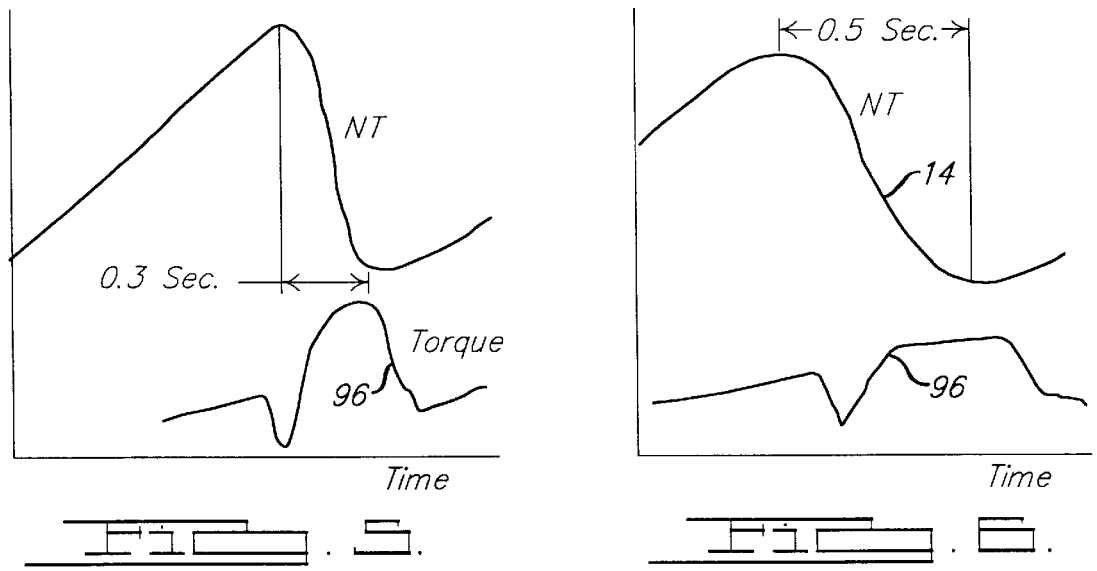
FIG. 5.
FIG. 6.
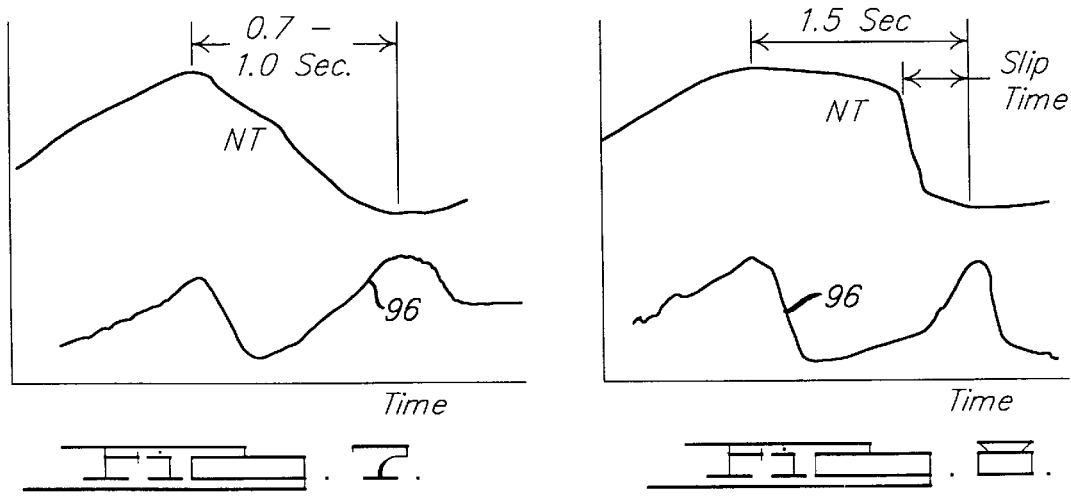
FIG. 7.
FIG. 8.

ADAPT PRESSURE
|  | Slip Time Error | | | | | | |
|---|---|---|---|---|---|---|---|
| | LN | MN | SN | Z | SP | MP | LP |
| Z | +5 | +2 | +1 | −1 | −2 | −4 | −6 |
| S | +6 | +3 | +1 | 0 | −1 | −3 | −6 |
| MS | +6 | +3 | +1 | 0 | −1 | −3 | −6 |
| M | +6 | +3 | +1 | 0 | −1 | −3 | −6 |
| ML | +6 | +4 | +3 | +3 | +2 | +2 | +2 |
| L | +6 | +6 | +5 | +5 | +5 | +5 | +5 |
| VL | +6 | +6 | +6 | +6 | +6 | +6 | +6 |
Target Ratio Error (row labels at left)
— 140
FIG. 14.
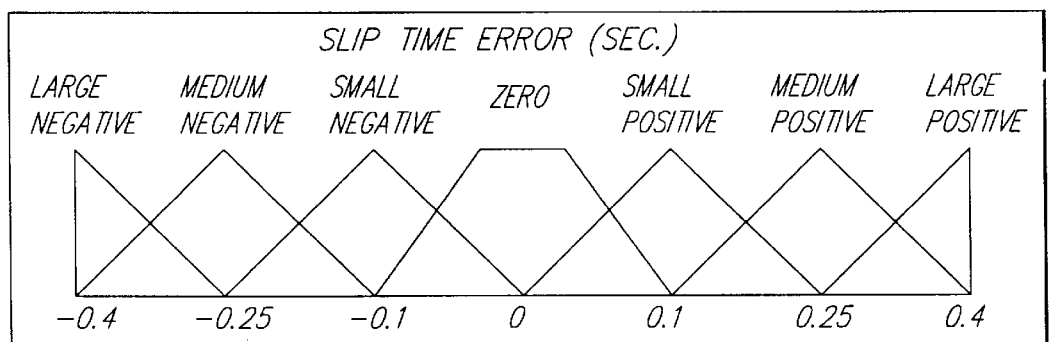
FIG. 15.
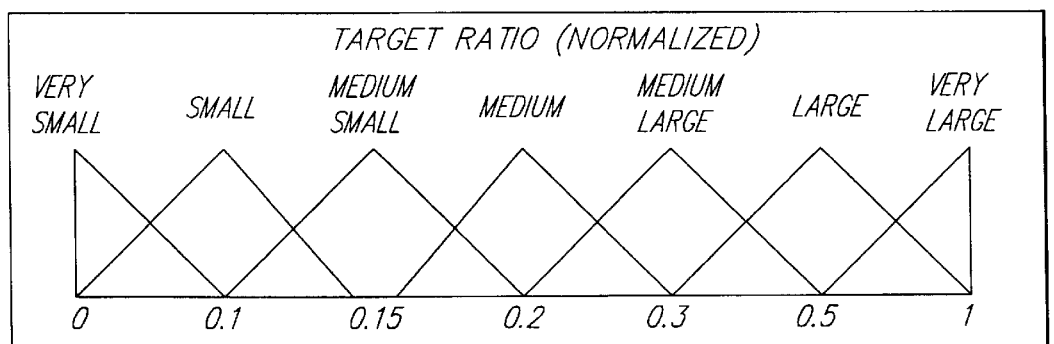
FIG. 16.

CLOSED-LOOP ADAPTIVE FUZZY LOGIC HYDRAULIC PRESSURE CONTROL FOR AN AUTOMATIC TRANSMISSION

BACKGROUND OF THE INVENTION

1. Technical Field

This invention relates to the field of electronic control of automatic transmissions for motor vehicles. More particularly, it pertains to adaptive control of pressure supplied to friction elements that produce gear ratio changes when engaged and disengaged.

2. Description of the Prior Art

In the control of an automatic transmission, certain gear ratio changes require an element (such as a friction clutch, friction brake, brake band or one-way clutch) to disengage and another element to engage, often at approximately the same time. In order for the oncoming element to engage correctly, it must have enough torque capacity to complete the shift within a specified time. If its torque capacity is too high, the shift is usually unacceptable due to its harshness. If its torque capacity is too low, engine speed will flare as the gear ratio approaches neutral during the shift, also resulting in an unacceptable shift.

The torque capacity of a friction clutch, brake or brake band is a function of the element's characteristics and the magnitude of hydraulic pressure applied to the element. The magnitude of hydraulic pressure is the result of a command from a powertrain control module (PCM) to an electrohydraulic solenoid-operated valve supplied from a source of pressurized fluid. The solenoid preferably is a variable force solenoid (VFS), which controls the magnitude to the commanded pressure. The pressure command to the solenoid is controlled by the strategy resident in the PCM program. An objective of this invention is to determine, command and apply the pressure magnitude supplied to the friction element that will produce the best shift.

In an automatic transmission, hydraulic pressure is used to control the engaged and disengaged state of the on-coming and off-going friction elements, which control the elements of the gearsets that produce gear ratio changes. Variation in pressure supplied to the oncoming friction element, a function of the element's torque capacity, can cause variations in shift quality over the service life of the vehicle. The process of this invention for adapting friction element pressure is used to compensate for changes in torque capacity of the friction element.

Conventional open-loop hydraulic pressure control requires a specific friction element torque capacity to produce a gear ratio change. Friction element torque capacity is controlled by throttle valve pressure, which is calculated with reference to transmission input torque, shift inertia torque, gain and spring offsets of the clutch mathematics model, temperature compensation, and dynamic throttle adder. However, open-loop pressure control provides no compensation for hardware changes, component wear and degradation, unit-to-unit variability, such as variable force transfer functions and physical tolerance variations. Furthermore, inherent conditions in a powertrain, such as localized temperature effects, coefficients of friction, engine torque, and sensor drift, cannot be adequately determined and accommodated.

A current strategy for commanding pressure at the start of a gear ratio change requires knowing inferred engine torque, inertia torque, and a calibrated offset. Some disadvantages of this strategy include: (1) calculated inferred engine torque may change from actual torque due to production variations, torque calculations, and engine wear over time; (2) commanded pressure may not be the same as actual pressure due to variations in the variable force solenoid; and (3) the same pressure does not always produce the same torque capacity due to component wear and variations among components.

It is preferred to use instead an adaptive process that employs fuzzy logic techniques to adapt the initial pressure of the oncoming friction element for an upshift, and the off-going element for a downshift.

Adaptive controllers are designed to correct for nonlinear or time-varying changes in system parameters. In nonlinear systems the parameters change as the operating conditions change. This can cause problems for a controller which is tuned for only a specific condition. An adaptive controller can adjust to changes in system characteristics. This keeps the controller tuned throughout all the operating conditions.

Time-varying systems also pose a problem for controllers without adaptive capabilities. In this case the controller may stay tuned for a limited amount of time until the system parameters change. This can be seen in systems such as a transmission where degradation and wear start to change the system parameters after some time. An adaptive system can compensate for these changes in system parameters by changing the output of the systems controller.

SUMMARY OF THE INVENTION

Adaptive capacity control can compensate for the previously discussed disadvantages by changing the commanded pressure to attain the correct friction element torque capacity over the life of the transmission. The method according to this invention for changing the friction element pressure uses an adaptive fuzzy logic algorithm. The adaptive algorithm changes a rule table stored in KAM, which produces a pressure offset for the calculated pressure for the oncoming element. The fuzzy logic looks for an error between desired and actual shift time. A positive error means the shift was quicker than desired, and a negative error means the shift took too long. The fuzzy controller changes the initial pressure based on the magnitude and sign of the error. The change in pressure is stored in a KAM table to be used for the next shift of the same gear change.

The fuzzy controller has four rules. First, in an upshift with a positive error, the controller decreases pressure to lengthen the time. Second, in an upshift with a negative error, the controller increases pressure to shorten the time. Third, in a downshift with a positive error, the controller increases pressure to lengthen the time. Fourth, in a downshift with a negative error, the controller decreases pressure to shorten the time.

It is an object of this invention to maintain consistent periods of friction element slip over the service life of an automatic transmission. It is another object to reduce the number of calibratable parameters required to prepare an automatic transmission for production, and to substitute for these parameters objective, measurable criteria, such as slip time. Other objects include improvement in durability of transmission components, and consistency of gearshifts over a broad spectrum of operating conditions including temperature, barometric pressure, speed, torque and road grade. The present invention has achieved the following advantages in automatic transmission design and operation: (1) shift quality has been improved and maintained consistently throughout the life of the transmission; (2) effort required and length of time to calibrate parameters for an electronically controlled transmission have been decreased substantially; and (3) improved gearshift consistency has resulted in increased durability of transmission components.

These advantages and objects are realized through the use of the present invention, which includes a self-organizing fuzzy logic controller that develops an adaptive pressure adder used to modify the magnitude of pressure supplied to a friction element of an automatic transmission. The controller uses a turbine speed versus engine torque table in KAM to store the adaptive pressure adder for each shift. Tables in KAM represent fuzzy rules which are altered based on shift performance criteria to produce a self-organizing fuzzy logic controller. The criteria, which define shift performance, include the ratio change slip time and the initial ratio change time divided by the desired slip time (called target ratio). The slip time calculation is the time from 10% to 90% of the ratio change to within 0.5 ms using interpolation methods. The initial ratio change time is the time from 10% to 25% of the ratio change also with an accuracy of 0.5 ms. The desired slip time is calculated from a calibratable turbine speed versus engine torque table in read only memory.

At the end of a shifting event, when all the adaptive criteria are met and the shift performance measures are calculated, an adaptive pressure adjustment is determined for the next shifting event with the same conditions. A two-input (slip time and target ratio) fuzzy logic controller is used to calculate the pressure adjustment based on the two-shift performance measures.

BRIEF DESCRIPTION OF THE DRAWINGS

FIGS. 3A, 3B and 3C together illustrate an adaptive fuzzy logic controller including the connections among system elements for controlling friction element pressure according to this invention.

FIG. 4 is a diagram that shows the variation of line pressure, speed ratio, and output shaft torque during a shift event.

FIGS. 5–8 are graphs that show the change of turbine speed and output shaft torque during a range of shift events.

FIG. 14 is an example of the adaptive strength matrix used in the third fuzzy system.

FIGS. 15 and 16 show examples of membership functions for slip time error and target ratio, respectively.

DESCRIPTION OF THE PREFERRED EMBODIMENT

Figures 1A, 2:
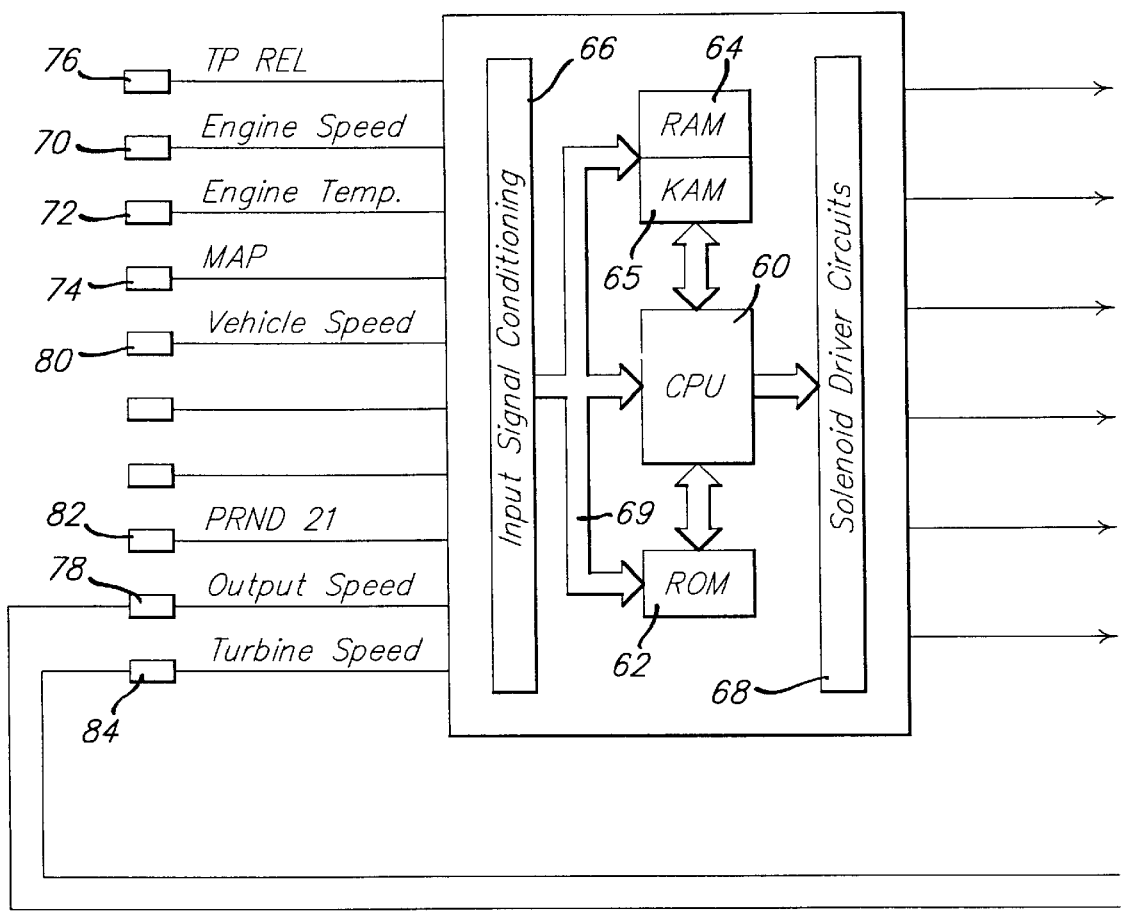
FIGS. 1A and 1B together form a schematic diagram of a system for use with this invention for controlling the friction elements of an automatic transmission.
FIG. 2 is a table that shows the engaged and disengaged states of hydraulic clutches and brakes and the state of overrunning couplings for each of the forward and reverse drive ratios of the transmission of FIG. 1.
Figure 1B:
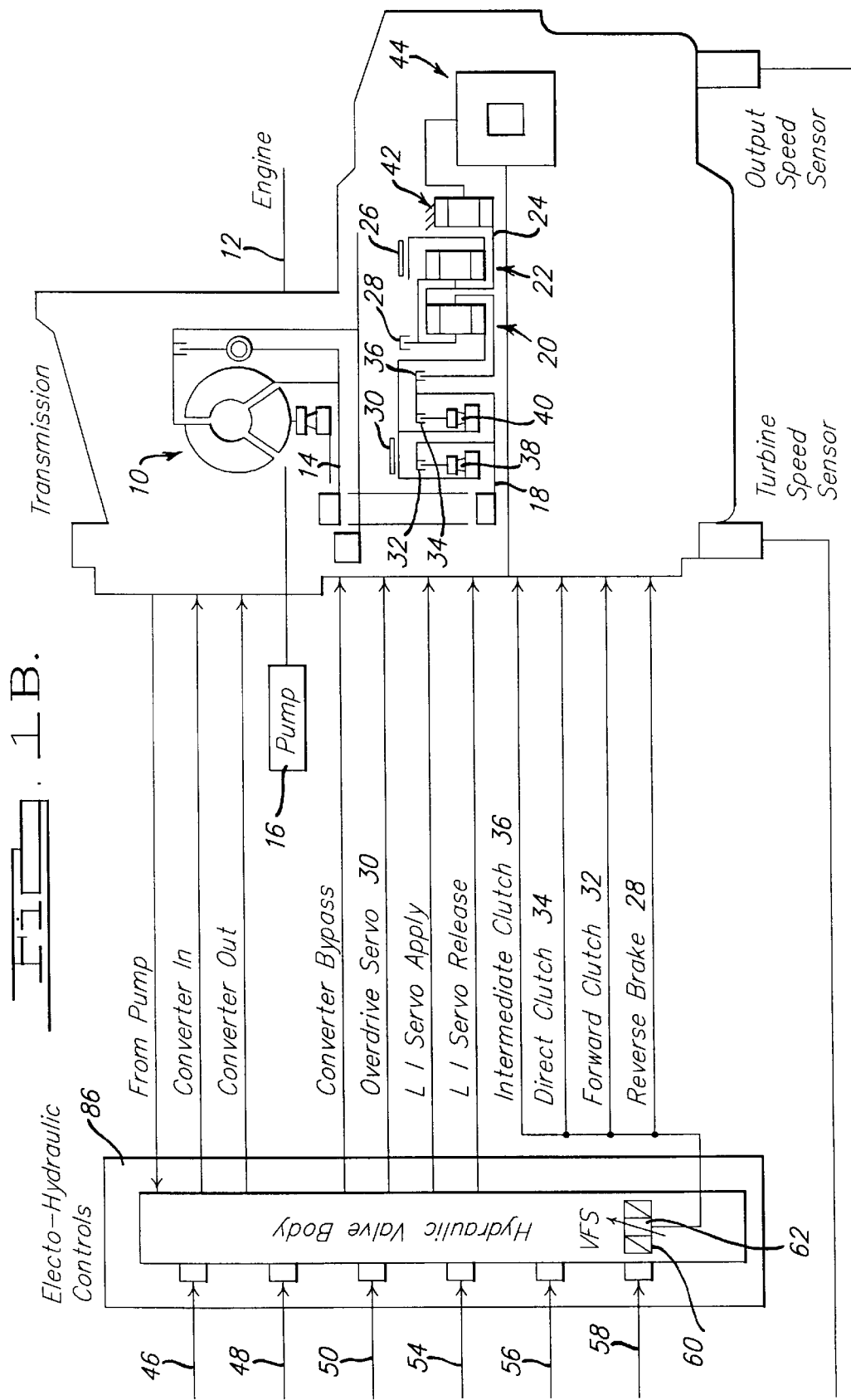

FIG. 1 shows in schematic form the arrangement of gearing, clutches, and brakes for an automatic transmission to which the present invention can be applied. The transmission operation is described fully in U.S. Pat. No. 4,509,389, which is assigned to the assignee of this invention. Reference may be made to that patent to complement this disclosure.

A torque converter 10 includes a bladed impeller that is connected to the crankshaft 12 of an engine and arranged in toroidal flow relationship with a bladed turbine, which is connected to turbine shaft 14. Also located in the toroidal flow path between the flow entrance of the turbine and the flow exit of the impeller is a bladed stator wheel, which provides a hydrokinetic torque reaction to effect torque multiplication. An overrunning brake supports the stator wheel and free-wheels to allow the stator to turn freely.

The transmission includes a hydraulic pump 16, which is driven by the engine, connected directly to the engine crankshaft through a central shaft and supplies fluid to the hydraulic circuit through the valve body.

Turbine shaft 14 drives a sprocket wheel which is connected through a drive chain or belt supported on the transmission input shaft 18.

The gearing includes two simple planetary gear units 20, 22, each gear unit including a sun gear, a ring gear, and a set of planet pinions rotatably supported by a carrier. The ring gear of gear unit 20 is connected to the carrier of gear unit 22 and to output shaft 24. The carrier of gear unit 20 is connected to the sun gear of gear unit 22. The planet pinions of each of the gear units is in continual meshing engagement with the corresponding ring gear and sun gear. The sun gear of gear unit 22 is adapted to be held against rotation by a low intermediate brake band 26. A reverse brake 28 is adapted to hold the sun gear of gear unit 22 and the carrier of gear unit 20 during reverse drive.

The sun gear of gear unit 20 is connected to a brake drum that is adapted to be held against rotation by overdrive brake 30 during overdrive operation.

During operation in the forward drive range, forward drive clutch 32 is engaged. During operation in the direct drive range, direct drive clutch 34 is engaged. During operation in the intermediate speed ratio, intermediate speed ratio clutch 36 is engaged.

Input shaft 18 is connected to one side of the forward clutch 32, and the output side is connected to the sun gear of gear unit 20 through overrunning coupling 38. Input shaft 18 is connected to one side of the direct drive clutch 34, and the output side is connected to the sun gear of gear unit 20 through overrunning coupling 40.

The chart of FIG. 2 indicates the clutches and brakes that are engaged or released during operation in each of the gear ratios. The symbol "X" is used in the chart to designate that the clutch or brake is engaged. Similarly, a blank in the chart indicates that the clutch or brake is released. In the case of the overrunning couplings, a "X" symbol indicates that torque transfer is occurring between the inner and outer races, and the symbol "O/R" indicates that the overrunning coupling is free-wheeling.

Clutch 32 is applied during operation in each of the first three driving ratios. Torque from the torque converter turbine shaft then is delivered through the chain to input shaft 18 and through the engaged clutch 32. The torque then is transferred through the overrunning coupling 38 to the sun gear of gear unit 20. Brake 26 is anchored during operation in the first two overdrive ratios and serves as a torque reaction point. Thus, torque is multiplied by the gear unit 20 and compounded with the torque multiplication of the second gear unit 22 to produce the maximum overdrive torque ratio. The output torque is delivered to the sun gear of the final drive gear unit 42, which includes a ring gear which is fixed against rotation. The output element for gear unit 42 is the planet pinion carrier, which carries pinions engaged with the sun gear and ring gear. That carrier drives the carrier of differential gear unit 44. The side bevel gears of the differential gear unit drive an axleshaft, which extends through the input shaft 18. Another axle halfshaft extends in the opposite direction, although it is not shown. Each axle halfshaft is connected to a driving wheel of the vehicle.

Intermediate speed ratio operation is achieved by engaging clutch 36 while clutch 32 and brake 26 remain applied. This action causes overrunning coupling 38 to free-wheel while torque is transferred through coupling 40. The torque input for the gear then is the carrier of gear unit 20 rather than the sun gear of that gear unit.

Direct drive is achieved by simultaneously engaging each of the clutches 32, 34, 36. This action causes the gear elements of gear units 20 and 22 to be locked together for rotation at the same speed.

Overdrive is obtained by disengaging clutch 32 and applying overdrive brake 30. Thus, the sun gear of gear unit 20 now becomes a reaction point, and the ring gear and carrier of gear unit 20 function as a driver, thereby producing an overdrive ratio. Gear unit 22 is inactive since all of the torque is distributed through the first gear unit 20.

Reverse drive is achieved by disengaging clutch 36 and reengaging clutch 32 while applying reverse brake or disc clutch 28. Thus, the carrier of gear unit 20 now becomes a reaction point, and the sun gear functions again as a driver. This causes the ring gear to rotate in the reverse direction and to drive output shaft 24.

As will be explained, the control of hydraulic pressure used to actuate the clutches and brakes of FIG. 2 is determined by execution of the control strategy of the present invention. FIG. 1A illustrates the arrangement of the electronic digital control system that operates on/off shift solenoids 46, 48, 50, converter clutch on/off solenoid 54, coast clutch solenoid 56, and variable force solenoid 58, which controls the operation of line pressure in response to a pulse-width-modulated signal applied to the winding of that solenoid.

The electronic control system includes a large scale integrated central processing unit 60; a clock pulse; interval and count-down and count-up timers; read-only memory (ROM) 62, in which programs controlling the logical operation of the CPU and data are permanently stored; read-write memory (RAM) 64; keep-alive memory (KAM) 65; input conditioning circuits 66, for converting analog output of various sensors to digital form for processing in the CPU's; solenoid driver circuits 68 for converting digital output of the CPU to analog voltage or current supplied to the windings of the solenoids; and data buses 69 carrying digital signals and data among the components of the control system.

Among the sensors that produce input data to the microprocessor are engine speed sensor 70, which produces a square wave voltage output having a frequency proportional to the speed of the crankshaft 12; temperature sensors 72, which sense engine coolant temperature and transmission fluid temperature by detecting an electrical resistance that varies with the temperature of the sensed medium; manifold absolute pressure sensor 74, which produces a signal representative of static pressure in the engine intake manifold downstream of the throttle valve; throttle position sensor 76, which produces a count representing the degree to which the engine throttle is open or the accelerator is depressed by the vehicle operator in relation to a reference position; output shaft speed sensor 78, which produces a voltage output signal having a magnitude proportional to NO, the speed of the output shaft 24; vehicle speed sensor 80; PRNDL sensor 82, which produces a linear voltage output whose magnitude varies with the position of the gear shift selector lever; and turbine shaft speed sensor 84, which produces a voltage or frequency proportional to the speed of turbine shaft 14.

Signals present at the output ports of the microprocessor are carried on lines connected to the solenoids, which operate valves located in the hydraulic valve body 86. The hydraulic valves open and close pressure sources to control operation of the friction elements, transmission gearing and torque converter in accordance with the results produced by executing the control algorithms stored in ROM 62. Input signals present at the input port of the microprocessor and data stored in RAM and KAM 64 are used during that execution. Pulse width modulated duty cycles produced by certain driver circuits in response to microprocessor output signals resulting from execution of control algorithms are applied to solenoids 46–56. A variable voltage or current is applied to the variable force solenoid operated valve 58, which operates a pressure control valve 62. The signal applied to solenoid 60 results upon execution of a control algorithm and control method of this invention. The adaptive pressure magnitude output by valve 58 is directed to clutches 32, 34, 36 and brake 28. Selective engagement of these and other friction elements determine the operating gear ratio, as FIG. 2 illustrates.

Figure 3A:
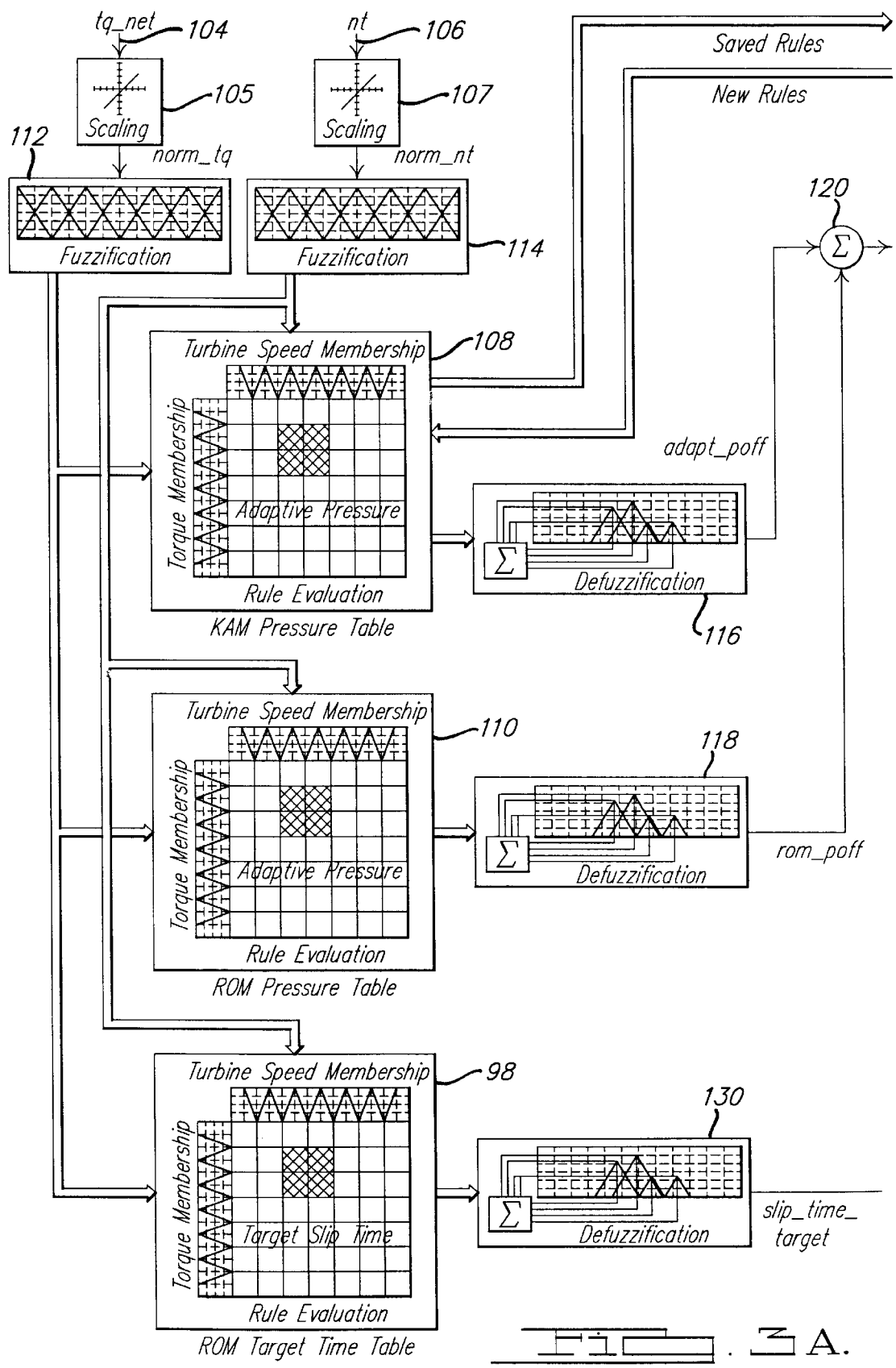
Figure 3B:
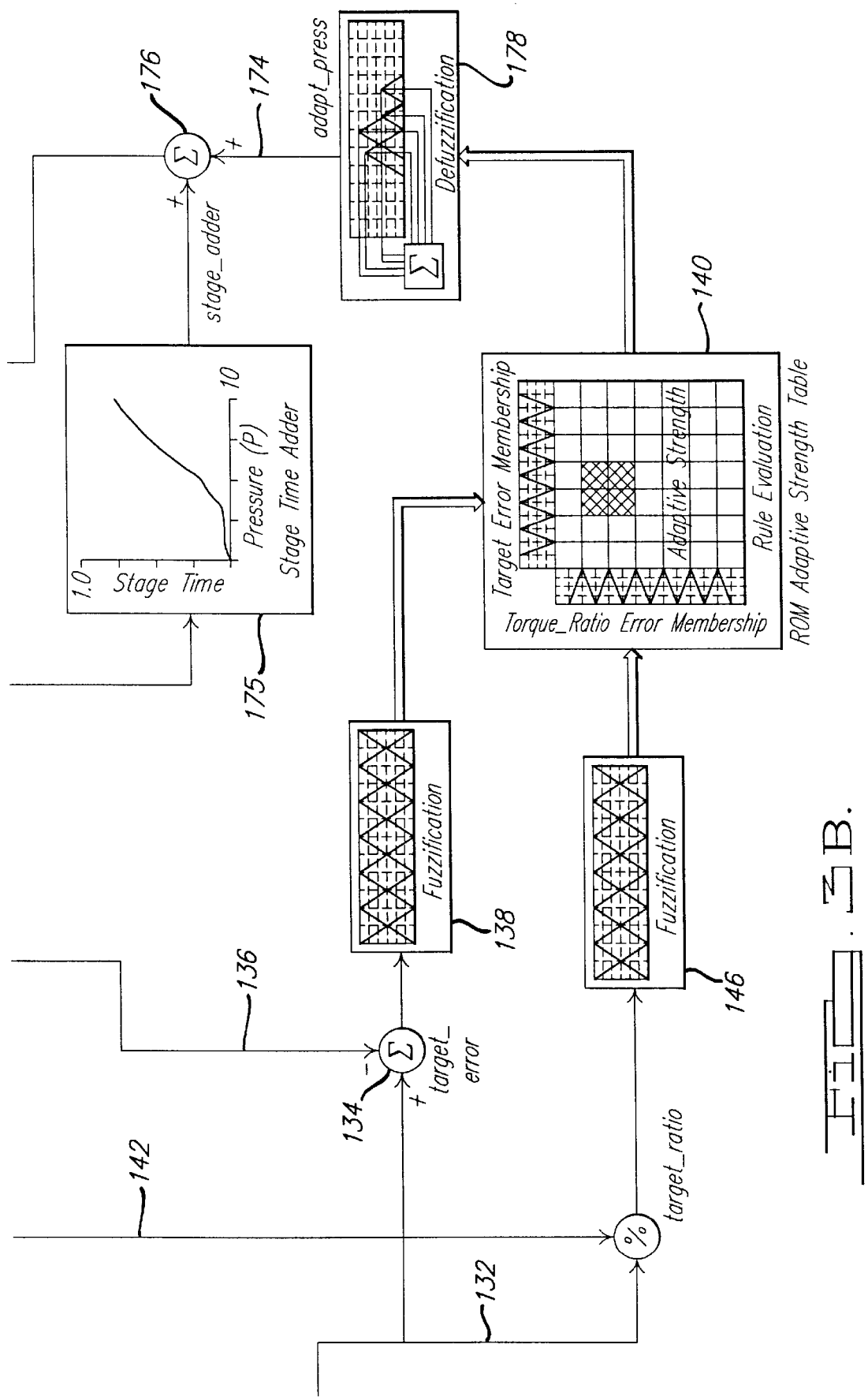

The adaptive controller according to this invention, illustrated in FIGS. 3A, 3B, 3C, changes the initial magnitude of hydraulic pressure supplied to a friction element involved in a gear ratio change through use of an adaptive pressure matrix stored in Keep Alive Memory (KAM). The controller adapts the pressure based on a previous shift having the same conditions. A shift must occur under specific conditions to ensure a repeatable shift.

The adaptive controller checks for repeatable conditions by monitoring the temperature of the transmission fluid and the change in the throttle position during a shift event. If the temperature is below a specific value, then the controller terminates the adaptive process. The adaptive process is also canceled when a large change in throttle position is detected during the shift.

Different shifts such as upshifts, downshifts, and skip shifts all use different combinations of friction elements to produce the various speed ratios of the transmission, as FIG. 2 shows. Because of this difference, a pressure correction to improve one type of shift may degrade another type of shift. To solve this problem, the adaptive controller uses separate adaptive pressure matrices in KAM for each type of shift.

Each type of shift can occur under different operating conditions including various throttle positions, engine torques, temperatures, atmospheric pressures, engine speeds, turbine speeds, and vehicle speeds. All of these conditions, especially the value of the throttle position, affect the pressure requirements for a shift event. An high throttle shift requires more initial shift pressure than does a closed throttle shift because engine torque input to the transmission is higher. Also, the pressure requirements at higher engine speeds may be more or less than those at lower speeds. These pressures depend on centrifugal forces in rotating clutches, turbine speed, and inertia torque resulting from a change in engine speed during a shift.

The adaptive controller uses engine torque and turbine speed to map the shifting conditions as a speed versus load table in adaptive pressure matrices. The engine torque calculation is used because it takes into account both throttle position and atmospheric pressure conditions. The turbine-speed calculation is used because it represents when a shift would occur. With both torque and turbine speed as inputs, the speed versus load map is able to capture and differentiate between points on the transmission shift curve. This mapping provided the adaptive system with the ability to distinguish between light throttle/high speed shifts, light throttle/low speed shifts, high throttle/high speed shifts, and high throttle/low speed shifts.

The controller includes calibratable values for scaling factors, adaptive gains, and target shift times. The scaling factors are set based on the ranges of the inputs to the adaptive system. The adaptive gains were assigned values based on sensitivity studies performed in a dynamometer. The gains were set at low values to allow the adaptive controller to reach the target shift time over a number of shifts rather than in one shift.

In the adaptive system a target time was required for all the speed versus load conditions for every type of shift. Calibration of shift times is required for three sequential upshifts (1-2, 2-3, 3-4), three sequential downshifts (2-1, 3-2, 4-3), and four skip shifts (1-3, 2-4, 4-2, 3-1).

FIG. 4 shows the variation over time of speed ratio 84, friction element pressure 86, and output shaft torque 88 during a shift event, following the occurrence of an electronic signal representing a shift command 89 issued by the microprocessor, which results in a change of the engaged and disengaged state of an oncoming friction element and an offgoing friction element. In FIG. 4, 90 represents 10% of the shift completed, 92 represents 25% of shift completion, and 94 represents 90% of shift completion. With reference to the shift completion percentages, stage time is the duration of the period beginning with the shift command and ending at 10% shift completion 90. Slope time is the duration of the period between 10% and 25% shift completion, 90 and 92. Slip time is the duration of the period between 10% and 90% shift completion, 90 and 94.

FIGS. 5–8 show for various shift events. The change over time of the speed NT of the turbine shaft 14 and the inferred or net engine torque 96. In FIG. 5, the shift event results from a line pressure that is too high for the current torque level into the transmission, and results in a fast, hard shift, the duration of the gear ratio change being approximately 0.3 seconds. In FIG. 6, line pressure is at a desired level for the current torque resulting in desirable speed and feel for the gear ratio change, which occurs over approximately 0.5 second. In the shift event of FIG. 7, line pressure is too low and produces a gear ratio change that is too long, extending approximately 0.7–1.0 seconds. During this gear ratio change the elements of the friction clutch slip relative to one another due to lower pressure than is required to fully engage the friction element, thereby potentially reducing service life and durability of the friction element. In the shift event represented by FIG. 8, line pressure is still lower than that of the shift event of FIG. 7. In a transmission having an accumulator system, the shift event occurs over a protracted period extending approximately 1.5 seconds until the accumulator has stroked completely, and noticeable shift bump occurs during the shift event.

The values of target slip time, which are stored permanently in ROM, are determined by a vehicle calibrator, who determines the target slip time on the basis of an acceptable feel of the shift event and its duration, and records the target slip time in matrix 98 with reference to the corresponding net torque and turbine shaft speed. In determining the target slip time for matrix 98, the calibrator decides on the acceptability of the shift event upon considering whether harshness or abrupt torque changes occur, and whether the duration of the shift event will adversely affect durability of the friction elements.

The calibrator decides subjectively on an acceptable shift slip time over the full range of net torque and turbine shaft speed. Alternatively, the period from the beginning of a shift to a predetermined percent shift completed, perhaps 50 percent, can be compared to a target period to complete the predetermined portion of a shift to create an error. This error is passed to a fuzzy system, from which a pressure correction can be determined for the next shift of the same type.

Figure 9:
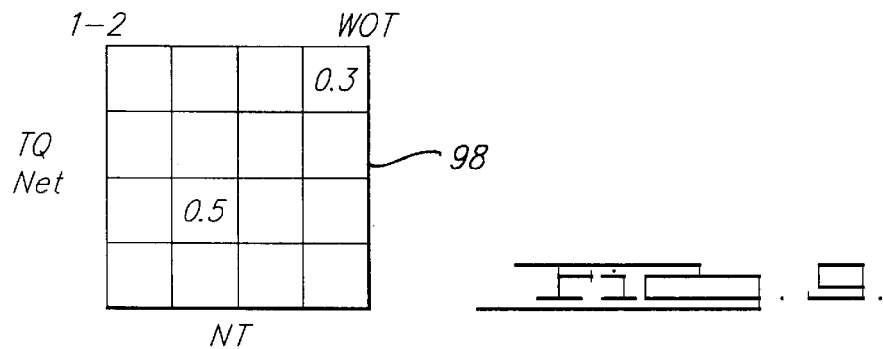
FIG. 9 shows a target slip time matrix and representative values of the table.

FIG. 9 shows representative values of target slip time accessible with reference to turbine speed and net torque as they may be stored for a 1-2 upshift in matrix 98, the wide open throttle condition being indicated at the upper right hand corner of the matrix.

Each fuzzy logic control includes five sections: a knowledge base, scaling process, fuzzification process, inference engine, and defuzzification process. The knowledge base defines the scaling factors for each of two inputs and the rule consequences for a single output. The scaling process converts each input into a normalized value with the scaling factors in the knowledge base. These normalized values are then converted to fuzzy variables by the fuzzification process. Once the fuzzy inputs are determined, the fuzzy inference engine selects the appropriate rules to fire from the knowledge base. Then these rules go through the defuzzification process to produce an output for the fuzzy system.

Scaling

The first process in the fuzzy expert system is to linearly scale the input signals 104, 106 with a range and base stored in the knowledge base for each input. The range is the distance between the upper and lower limits designated for the input. The base is the lower limit of the input signal. The scaling equation below results in a normalized signal norm x with a value between 0 and 1.

$$\text{norm } x = \frac{(x - \text{base})}{\text{range}}$$

The midpoint or zero (if the input's lower limit is negative) of the normalized input was typically centered at a value of 0.5. For example, if the turbine speed signal has a minimum value of 1500 rpm and a maximum value of 6500 rpm, the scaling factors for this signal include a range of 5,000 rpm and a base of 1,500 rpm. The resulting normalized signal receives the following values at various turbine speeds; 0 at 1,500 rpm, 0.5 at 4,000 rpm and 1.0 at 6,500 rpm.

Fuzzification

Figure 10:
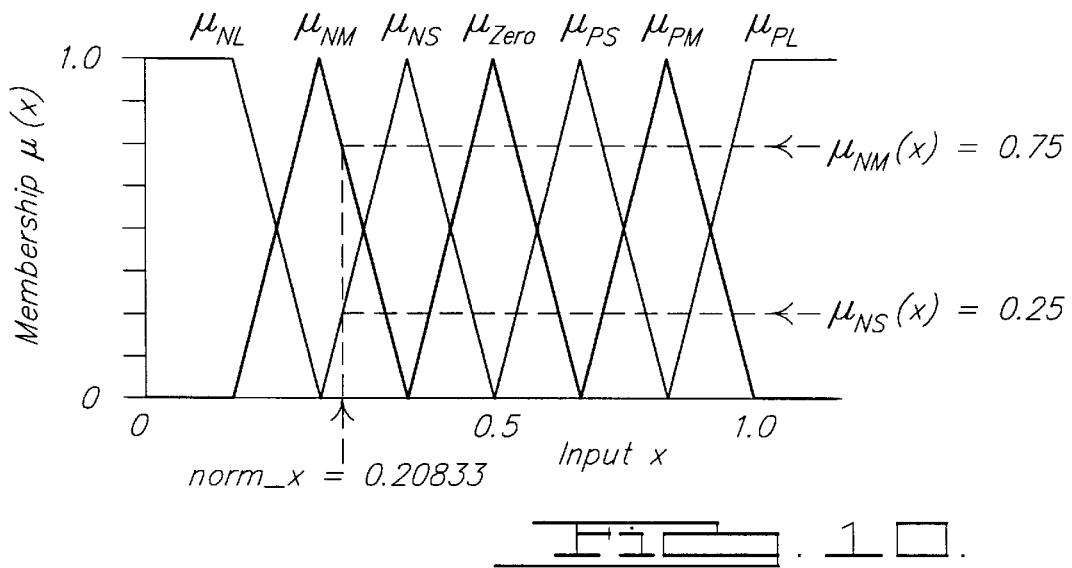
FIG. 10 shows membership functions and a normalized input for use in a fuzzification process step.

The fuzzification process produces fuzzy variables from the normalized inputs using fuzzy sets or membership functions. The fuzzification step uses triangular membership functions evenly spaced along the x-axis as shown in FIGS. 3A and 10. The x-axis is referred to as the universe of discourse in fuzzy logic terminology. The universe of discourse in this case ranges from 0 to 1. This is common to all the signals supplied as input to fuzzification steps of this invention in that they have been normalized to the same 0–1 range. This allows the fuzzification routine to fuzzify any input signal without having to define a different universe of discourse for each signal.

After the input is normalized to values between 0 and 1, next an integer pointer (pnt) to the rules that need firing is calculated using the normalized input and a constant nmf $pnt=int(norm\_x \cdot nmf)$ The value of nmf is an integer number denoting how many regions the universe of discourse is divided into. In this case the universe of discourse is divided into six regions, giving nmf a value of six. After the pointer to the rule is determined, the two memberships (x_mem[O] and x_mem[l]) for the input are calculated using the following equation $x\_mem[O]=|(fpnmf \cdot norm\_x)-(pnt+1)|$ wherein norm_x is the normalized input, fpnmf is a constant, and pnt is a pointer. The value of fpumf is the floating point equivalent to nmf, which is also equal to the number of membership functions minus one. The following equation only requires the first membership value because the two memberships functions have inverse slopes causing the memberships to add to one.

$x\_mem[1]=(1.0-x\_mem[O])$

FIG. 10 illustrates the fuzzification process on a normalized input signal norm_x, which arbitrarily equals 0.20833 in the figure. The input has a memberships of 0.75 and 0.25 in the relevant triangular fuzzy sets. These two memberships are assigned to variables starting with the lower or most negative membership resulting in the two memberships, x_mem[O]=0.75 and x_mem[1]=0.25.

The procedure starts by receiving the addresses for the normalized input signal x, pointer pnt, and first membership mem[O]. The normalized input is then clipped to a maximum of 0.999 or a minimum of 0.0 with indirect addressing. Once the input is guaranteed to be less than one and greater than zero, the pointer pnt is calculated as an integer value. Next the membership value for mem[O] is calculated and stored. The address is then incremented to indirectly save the membership mem[1]. The routine returns to the point from where it was called after the two memberships are stored. This routine is repeated for every input to the fuzzy control system. Once completed for the two inputs, the fuzzy rules can be evaluated in the inference engine.

Inference Engine

The antecedent memberships determined in the fuzzification process are used as inputs to a set of fuzzy if-then rules. The antecedent memberships are used to check the conditions necessary to fire the rules in the inference engine. The antecedents are typically combined using a minimum operator to form one antecedent value which determines the strength of the rule. If the strength of the rule is greater than zero, then the consequence of the rule will be executed to a certain degree. Each consequence in the rule is described by a linguistic term such as "add a little pressure" or "subtract a little pressure". Fuzzy sets are used to realize these linguistic terms for each consequence. The membership or weighting of each consequence set is defined by the strength of the rule being fired. Typically more than one rule fires at a given time, producing a number of consequences.

The task of the inference engine is to evaluate if-then rules based on memberships determined in the fuzzification procedure corresponding to two normalized input signals ($x_1$ and $x_2$). The inference engine uses a table to evaluate efficiently only the rules that need to be fired. This is done by indexing the table with pointers to find the desired rules.

Each rule is in the form of an if-then statement, such as

IF Antecedent1 AND Antecedent2 THEN Consequence wherein Antecedent1 is the membership of $x_1$ and Antecedent2 is the membership of $x_2$ within their respective triangular membership functions. The memberships for the two antecedents are represented by the symbols $\mu_{Ant1}(x_1)$ and $\mu_{Ant2}(x_2)$. The multiplication operation is used to represent the AND operation between the two antecedent membership values. The result of the multiplication determines the strength of the rule consequence $\text{IF} \mu_{Ant1}(x_1) \times \mu_{Ant2}(x_2) \text{ THEN Consequence}$ (6.6)

Figure 11:
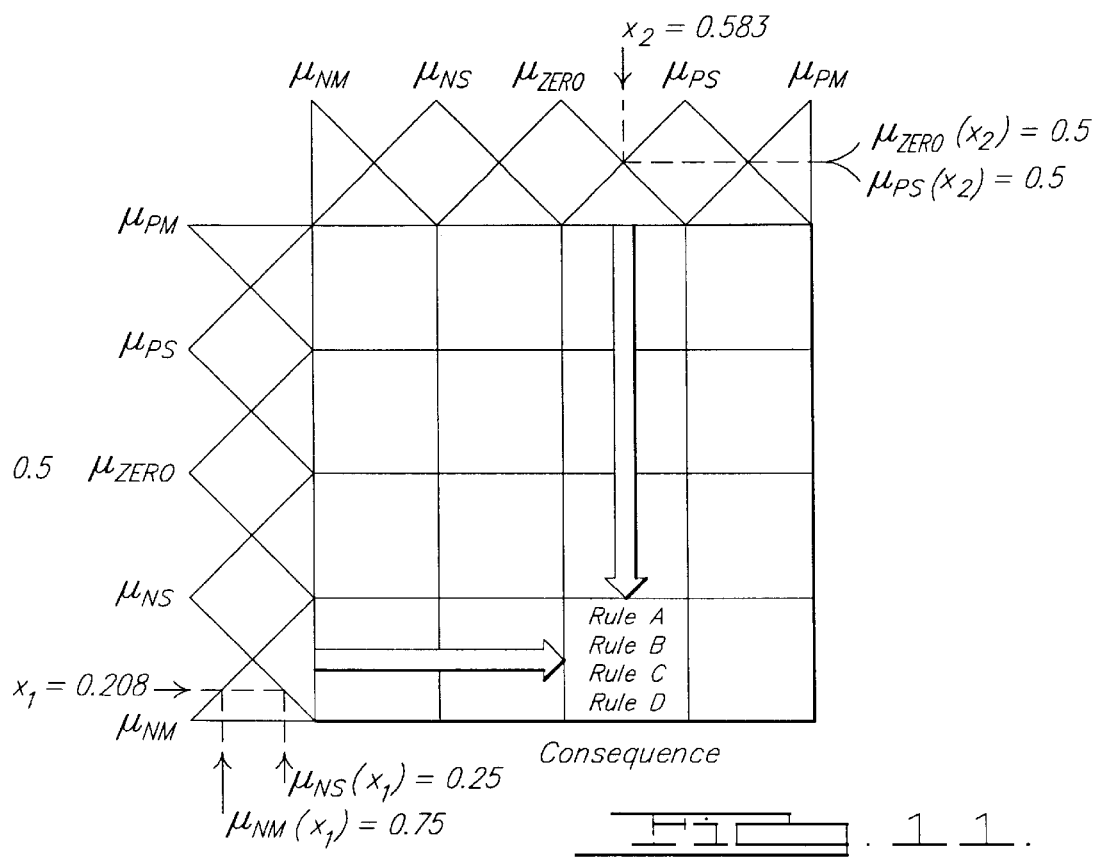
FIG. 11 shows an example of using the inference table method to determine the four rules from two inputs.

Because $x_1$ and $x_2$ each have two memberships, there are four combinations of antecedents for two inputs. This results in a maximum of four rules being able to fire at one time. FIG. 11 shows an example of using the inference table method to determine the four rules from the inputs $x_1$ and $x_2$. The rules for the two inputs include:

| Rule A: | IF $\mu_{nm}(x_1)$ AND $\mu_{zero}(x_2)$ THEN Consequence$_1$ |
|---|---|
| Rule B: | IF $\mu_{nm}(x_1)$ AND $\mu_{ps}(x_2)$ THEN Consequence$_2$ |
| Rule C: | IF $\mu_{ns}(x_1)$ AND $\mu_{zero}(x_2)$ THEN Consequence$_3$ |
| Rule D: | IF $\mu_{ns}(x_1)$ AND $\mu_{ps}(x_2)$ THEN Consequence$_4$ |

The rule strength for each rule in this example is given as:

| Rule A: | Rule_strength$_1$ = (0.75 × 0.5) = 0.375 |
|---|---|
| Rule B: | Rule_strength$_2$ = (0.75 × 0.5) = 0.375 |
| Rule C: | Rule_strength$_3$ = (0.25 × 0.5) = 0.125 |
| Rule D: | Rule_strength$_4$ = (0.25 × 0.5) = 0.125 |

The total of the four rule strengths always adds up to one, regardless of the membership values.

Each rule consequence is stored in a table cell indexed with the pointers calculated in the fuzzification process for the two inputs. The rule consequence is determined by the value in each cell. This allows for trapezoidal membership functions by giving two adjacent cells the same consequence.

The inference engine for this system uses an iterative routine, called as a separate procedure similar to the fuzzification routine. The procedure receives six values when called from the fuzzy system.

The first value is a flag called ADAPT FLAG, which allows the rule consequences and strengths to be saved for the adaptive process. The second value is the pointer (XPNT) for the x-axis fuzzy input. The third value is the address of the first membership for the x-axis input called MEMX. The fourth and fifth values are similar to the first and second inputs, but they are used for the y-axis fuzzy input to the inference engine. The last value passed to the routine is the address of the matrix in the knowledge base containing the consequences for the if-then rules, such as matrices 89, 108, 140.

The Rulestrength routine iterates four times with the use of two counters (i and j). The third counter k is used to index through the four rules so that they are saved for the adaptive process. The routine first indexes through the consequence table to store the selected consequences to a variable called FIRE_RULE. Then the routine calculates the rule strength by multiplying the two antecedent membership values and storing the result into RULE_ST. If ADAPT_FLAG was set, the FIRE_RULE and RULE_ST values are stored in two arrays (ADAPT_RULE[ ] and ADAPT_STRENGTH[ ]) indexed by the counter k. The next process in the routine executed part of the defuzzification process by calculating the values FUZ_NUM and FUZ_DEN.

Defuzzification

Figure 12:
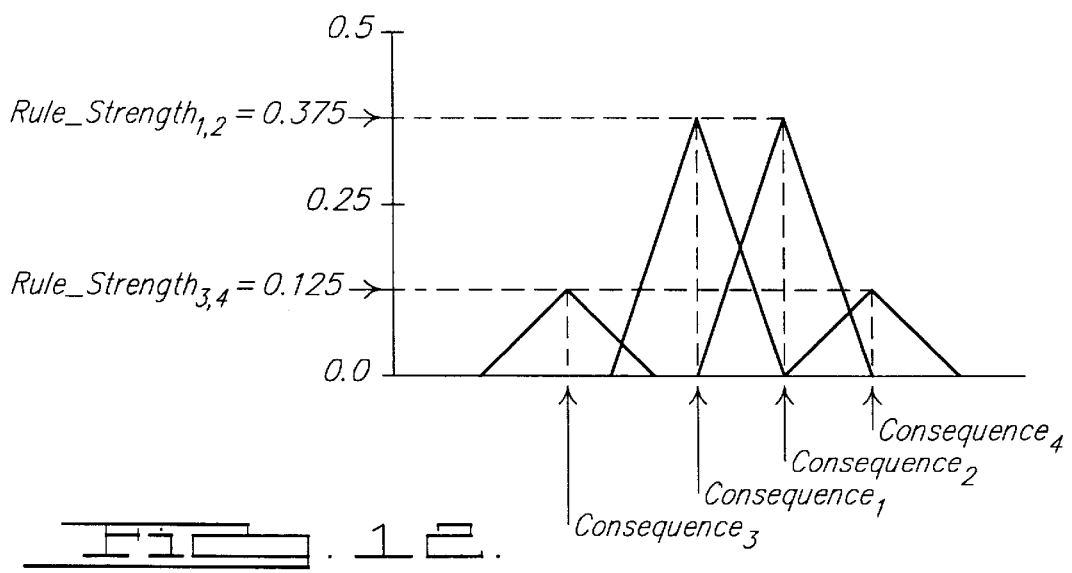
FIG. 12 graphically represents each rule produced by the inference engine, each rule strength and its location at the center of the respective consequences.

The defuzzification process in this application uses a center of gravity routine to evaluate the overall output from the four rules fired in the inference engine. Each rule output is considered a fuzzy triangular membership function with the height determined by the rule strength and the center at the value of the consequence, as shown in FIG. 12. The center of gravity is calculated by taking the average of the four consequences weighted by the rule strength. The first half of the center of gravity calculation is executed in the Rulestrength routine. The FUZ_NUM variable equals the summation of the rule consequences weighted by the rule strengths; the FUZ_DEN variable equals the summation of the rule strengths. The center of gravity y, is then calculated by dividing these two variables as shown in the following equation $$\frac{\sum_{n}(Rule\_Strength_{nx}Consequence_{n})}{\sum_{n}(Rule\_Strength_{n})}$$

This final calculation is performed outside of the Rulestrength routine to allow for more rules to be added to the center of gravity calculation. This enabled the fuzzy system to fire more rules by executing the Rulestrength procedure again with another rule base.

Initial Pressure Adjustment

When a change in gear ratio is commanded by the microprocessor, i.e., when shift command 89 issues, the signals tq_net 104 and NT 106, representing the magnitude of net inferred engine torque and turbine speed, respectively, are used with scaling functions 105, 107, respectively, to produce corresponding normalized variables norm_tq and norm_nt, which are used as input to fuzzy sets or membership functions 112, 114. The sets are non-crisp functions, described in linguistic terms and have specific shapes. Sets in conventional logic differ from fuzzy sets in that conventional sets are crisp rather than shaped. Crisp sets only allow an input to either belong or not belong to a set rather than to have an intermediate degree of membership. Fuzzy sets allow for this intermediate membership with a value between 0, representing full membership, and 1, representing no membership, depending on the shape of the set. Membership is determined by the location at which the input falls in the set.

The initial pressure adjustment (adapt_poff) is determined in the first fuzzy system. The inputs to this system are turbine speed and inferred engine torque. The knowledge base of rule consequences for this system are stored in a KAM table for each shift. This table (Adaptive Pressure Matrix 108) contains consequence values in units of pressure (in increments of 1 psi). These rule consequences are initialized to zero at the start the adaptive process, then the values are modified by the adaptive routine to correct for errors in slip time.

The knowledge base in the system contains scaling factors 105, 107 to produce fuzzy membership sets for turbine speed and engine torque inputs. Also included in the knowledge base are the rule consequences to produce the adapt-poff pressure adjustment. The rule consequence membership sets, represented by triangular functions are centered at the values stored in the rule table and can range preferably from −127 psi to +127 psi. With these consequence memberships and the two input memberships, rules of the following form are created in the fuzzy system:

IF (nt is FAST) AND (torque-net is HIGH) THEN (ADD A SMALL AMOUNT OF PRESSURE)

The memberships for the two antecedents and the consequence can vary depending on the inputs and the values in adaptive pressure matrix 108.

The process for determining adapt-poff first normalizes engine torque and turbine speed inputs, producing norm_nt and norm_tq. Additionally, the first step initializes two pointers (pnt_pam and pnt_target) to the addresses of matrix 108 and a target slip time matrix 98. Then the normalized values are fuzzified to produce two sets of memberships (tq_mem[ ] and nt_mem[ ]) which are passed to the Rulestrength procedure. The Rulestrength procedure is called. With the adapt_flag set, the rule consequences and strengths are stored in the adapt_rule[ ] and adapt_strength [ ] arrays.

The consequences, which fired in the Rulestrength procedure, are then defuzzified to produce the pressure output adapt_poff, which is described in detail next.

Example Pressure Calculation

Assume turbine speed (nt) input is 5475 rpm and inferred engine torque (inf_torque) input equals 41 ft/lbs at the start of a shift. The normalized turbine speed equals 0.8833 when scaled with a range of 4500 rpm and a base of 1500 rpm. The normalized torque equals 0.2333 when scaled with a range of 90 ft-lbs and a base of 20 ft-lbs. These two normalized values then result in the following memberships:

nt is Medium Fast (0.7) AND Fast (0.3)

inf_torque is Low (0.6) AND Medium Low (0.4)

Assume that the four rule consequences in the rule table for these inputs are 4, 0, −2, and 6 psi. The following four fuzzy rules are then created:

| Rule A: | If $nt_{MF}(0.7)$ AND $inf\_torque_L(0.6)$ THEN Add 4 psi |
| Rule B: | If $nt_{MF}(0.7)$ AND $inf\_torque_{ML}(0.4)$ THEN Add 0 psi |
| Rule C: | If $nt_F(0.3)$ AND $inf\_torque_L(0.6)$ THEN Add −2 psi |
| Rule D: | If $nt_F(0.3)$ AND $inf\_torque_{ML}(0.4)$ THEN Add 6 psi |

The four rules are then evaluated in the inference engine by multiplying the memberships together, finding the rule strengths for each rule. The four rule strengths are associated to each rule consequence as follows:

| Rule A: | Rule Strength = 0.42 Rule Consequence = 4 |
| Rule B: | Rule Strength = 0.28 Rule Consequence = 0 |
| Rule C: | Rule Strength = 0.18 Rule Consequence = −2 |
| Rule D: | Rule Strength = 0.12 Rule Consequence = 6 |

These values are then stored for the adaptive algorithm and used in the defuzzification process to find adapt_poff. The adapt_poff calculated for this example is:

$$adapt\_poff = \frac{(0.42 \times 4) + (028 \times 0) + (018 \times -2) + (0.12 \times 6)}{0.42 + 0.28 + 0.18 + 0.12} = 2.4\ psi$$

This pressure is then added to the initial shift pressure calculation as an adaptive correction.

Shift Event

At the start of a transmission shift, the controller calculates the target speed ratio, and stores the throttle position and start time before determining the initial shift pressure. The target speed ratios, clutch gain factors, and shift inertia's are determined separately for each shift. Thereafter, the expected change in speed ratio is calculated. Then a start of shift time (shift_start) is captured from a one millisecond counter. Additionally, the throttle position at the start of the shift is also captured at the same time. Finally, the initial friction element pressure is calculated as a function of the shift inertia, inferred engine torque, and adaptive adjustment adapt_poff.

When the speed ratio during the shift changes, the control calculates percent shift complete, i.e., how much of the shift is complete. The adaptive strategy captures the time when the shift percent passes 10, 25, 90 and any other relevant shift complete. Preferably the process for capturing the time is done every sixteen milliseconds starting with the speed ratio calculation. The speed ratio is calculated by dividing turbine speed (NT) by output shaft speed (NO). This value is then used to calculate shift_percent, slip_time, slope1_time, stage_time, and any other relevant time. Additionally, the throttle position is also captured at this time. Once these values are captured, a slip_time_target is calculated for comparison to actual slip_time.

Target Time Evaluation

A second fuzzy controller determines the desired slip_time_target. This fuzzy system receives the same turbine speed and inferred torque inputs as the first fuzzy system that produced adapt_poff. This eliminates the need to re-scale and fuzzify the inputs because the memberships are already calculated.

The knowledge base of rule consequences for this fuzzy system is stored in calibratable ROM table called the Target Slip Matrix 98. The desired time for a shift at a specific condition of speed versus load was determined by calibration as described above and stored in Matrix 98 for each gear ratio change. The time values are preferably stored in increments of sixteen milliseconds, allowing the target slip times to fit into a single byte of memory. This allows the consequences to range from 0 ms to 4096 ms with a resolution of sixteen milliseconds. The target slip times are converted to values of milliseconds by a defuzzification process, resulting in a target time value called slip_time_target.

The code for the target time evaluation is executed at the end of each shift along with calculating the absolute change in throttle position during the shift event. The calls to the fuzzy logic routines are similar to those in the first fuzzy system except that the adapt_flag was not set in this case.

Example Target Time Calculation

For this example, the same input values for turbine speed (nt) and inferred engine torque (tq_net) are employed as in the previous example. The same scaling factors and fuzzification process also applies for these inputs. The membership values calculated previously in the fuzzification routine were:

nt is Medium Fast (0.7) AND Fast (0.3)

inf_torque is Low(0.6) AND Medium Low (0.4)

The four rule consequences for the this example are 60, 64, 72, and 68, which correspond to 960 ms, 1024 ms, 1152 ms, and 1088 ms respectively. These consequences and input memberships result in the following four fuzzy rules:

| Rule A: | If $nt_{MF}(0.7)$ AND $inf\_torque_L(0.6)$ THEN 60 |
| Rule B: | If $nt_{MF}(0.7)$ AND $inf\_torque_{ML}(0.4)$ THEN 64 |
| Rule C: | If $nt_F(0.3)$ AND $int\_torque_L(0.6)$ THEN 72 |
| Rule D: | If $nt_F(0.3)$ AND $inf\_torque_{ML}(0.4)$ THEN 68 |

These four rules are then evaluated in the inference engine by multiplying the antecedent memberships together, resulting in a rule strength for each rule. These values are not stored for the adaptive routine in this system. The four rule strengths and associated rule consequences are as follows:

| Rule A: | Rule Strength = 0.42 Rule Consequence = 60 |
| Rule B: | Rule Strength = 0.28 Rule Consequence = 64 |
| Rule C: | Rule Strength = 0.18 Rule Consequence = 72 |
| Rule D: | Rule Strength = 0.12 Rule Consequence = 68 |

These values are then used to produce the value for the desired shift time in the defuzzification process. The defuzzification calculation for this example would result in the following value for slip_time_target:

$$\text{slip\_time\_target} = 16. \times \frac{(0.42 \times 60) + (0.28 \times 64) + (0.18 \times 72) + (0.12 \times 68)}{0.42 + 0.28 + 0.18 + 0.12}$$

$$= 1027 \text{ ms}$$

This target time value is then used to determine an error calculation (target-error) 136 in a third fuzzy system designed to adapt the initial shift pressure.

The adapted line pressure, according to the present invention, to be applied to a friction element to produce a gear ratio change during a shift event is LP learned=LP+adapt_poff+rom_poff wherein LP learned is the line pressure applied to the friction element in accordance with this invention, LP is the line pressure magnitude produced by a source of line pressure 124 before its magnitude is adapted in accordance with this invention, adapt_poff is the output of the second fuzzy system, and rom_poff is the output of defuzzification 118 that follows the rule evaluation of adaptive pressure matrix 110 stored in ROM after the immediately preceding shift of the same type as the shift being adapted.

Adapt_poff and rom_poff are combined at summing junction 120, and their sum is added at summing junction 122 to the magnitude of pressure, 50–70 psi, produced by a source of lined pressure 124 operating under conventional control.

A VFS transfer function 126 relates pressure output from summing junction 122 and the corresponding magnitude of electric current supplied to variable force solenoid 58, which supplies pressure at the adapted magnitude to a friction element that is engaged to produce the shift.

At 128, the magnitude of various parameters associated with the transmission shift event are plotted against time as the independent variable. From these variables and functions, the following outputs are produced slope1_time, slip_time, stage_time, and throttle position change. Speed ratio in which the transmission is operating is defined as NT/NO. The percent shift completed is $$\text{Shift Percent} = 1 - \frac{(\text{current speed ratio} - \text{speed ratio at occurence of shift command})}{(\text{desired speed ratio} - \text{speed ratio at occurence of shift command})}$$

The percent shift completion is calculated continually during the shift event, and from its magnitude slip_time, slope1_time, and stage_time are determined as described above.

Slip_time_target 132, determined from the second fuzzy system with reference to turbine speed membership and torque membership, is connected to summing junction 134, where slip_time is subtracted to produce target_error 136, one input to a third fuzzy system at fuzzification process step 138.

Slope1_time 142 is divided by Slip_time_target 132 to produce target_ratio 144, which is used as another input to a third fuzzy system at fuzzification process step 146. A negative value of target_error represents a shift that is too long; a positive value indicates a shift that is too short.

Alternatively, the input shift time error can be calculated by taking the difference between target shift time and the corresponding actual shift time, such as the time to complete 50% of the shift. In this case, the actual shift time is calculated by subtracting the time captured at the start of the shift from the time at 50% shift complete Adaptive Pressure Resolution The two inputs to the third fuzzy system indicate conditions for adapting pressure. The membership functions for this input are preferably represented by triangular membership functions, such as those of FIGS. 18 and 19.

The third fuzzy system resolves the pressure adjustment required in the Adaptive Pressure Matrix 108 with a knowledge base of rule consequences. The rule base for this system was realized in a calibratable table Adaptive Strength Matrix 140 located in ROM, as shown in FIG. 3C. The calibration values for the rule consequence matrix are in units of 1 psi pressure increments. The rules are applied to increase pressure when a shift is too long, decrease pressure when a shift is too short, and not change pressure around the desired shift times to incorporate a dead band. These rules produce a desired pressure for adjusting the Adaptive Pressure Matrix 108 called adapt_press 174.

The adapt_press value 174 is then passed to the Adapt Tables routine to modify the initial shift pressure for the next shift.

Figure 13:
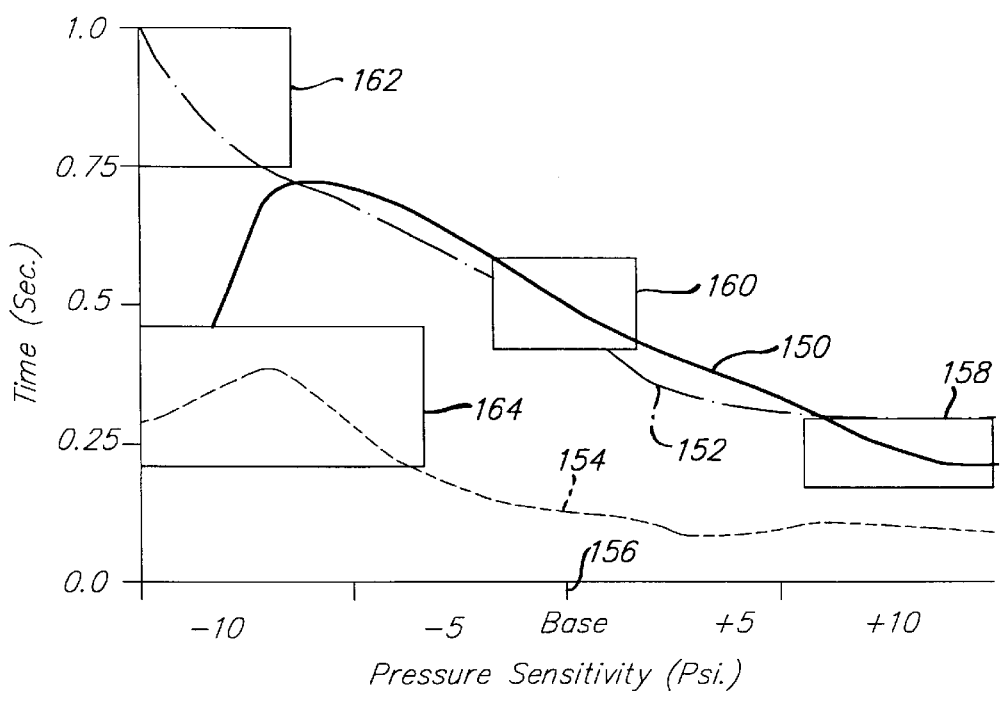
FIG. 13 is a diagram that shows the variation of slip time, slope time and stage time during a gear ratio change for a range of friction element pressure.

FIG. 13 shows on its vertical scale the change in duration of slip time 150, stage time 152 and target ratio 154 that result from a change in magnitude of pressure applied to a friction element to produce a shift event with reference to a base friction element pressure, the vertical axis 156. In zone 158, slip time and the duration of the gear ratio change are too short; therefore, clutch pressure should be decreased. In zone 160, target slip time and the duration of the gear ratio change are acceptable; therefore, the friction element pressure should be maintained at its current level. In zone 162, stage time is too long and the gear ratio change is too long; therefore, to correct these conditions to a more acceptable shift event, clutch pressure should be increased by a large amount. In zone 164, the target ratio is too high and the gear ratio change too long; therefore, to correct these conditions, clutch pressure should be increased by a medium amount.

The adaptive strength matrix 140 shown in FIG. 14 is populated with adaptive pressure values that would correct the problems discussed with reference to the zones of FIG. 14 and produce an acceptable gear ratio change. Across the x axis, slip time error varies in degree from large negative LN, medium negative MN, small negative SN, zero Z, small positive SP, medium positive MP, and large positive LP. Along the vertical axis the target ratio error varies in degree from zero Z, small S, medium small MS, medium M, medium large ML, large L, and very large VL. The upper right hand corner of matrix 140 contains adaptive pressure values that would suitably correct for the short slip times described with reference to zone 158. The upper portion of the middle column of matrix 140 contains adaptive pressure values that correspond to the acceptable gear ratio change represented by zone 160. The magnitudes of adaptive pressure located at the left hand central area of matrix 140 would correct with the deficiencies represented in zone 162. The lower rows extending across the width of matrix 140 contained adaptive pressure magnitudes that would correct for the deficiencies described above with reference to zone 164.

FIG. 18 shows slip time error in seconds extending between −0.4 and 0.4 seconds, that range varying between large negative slip time error and large positive slip time error. FIG. 18 shows the fuzzy sets employed during process step 138. Similarly, FIG. 19 shows target ratio extending over a normalized range between 0.0 and 1.0, each of the triangular fuzzy sets are arranged between very small and very large. The fuzzy sets of FIG. 19 are identical to those of process step 146.

An example of the steps to determining adapt_press from the third fuzzy system, assume fuzzy sets 138 produce two target_error memberships (0.5, 0.5), and fuzzy sets 146 produce two target_ratio error memberships (0.6, 0.4). These are combined through use of the third fuzzy logic system to produce adapt_press 174 as output to summing junction 176. If slip time error is zero and target_ratio is medium, then the corresponding rule of matrix 140 fires and the corresponding adaptive pressure is 0 psi. If slip time error is between small-negative and zero, and target ratio is between small and medium-small, the rule consequences +1, 0, +1 and 0. The output of defuzzification step 178 is calculated as follows from the corresponding Rules strength and Rule consequences:

$$= \sum_j \frac{\text{Rule strength} \times \text{Rule consequence}}{\sum (\text{Rule strength})}$$

$$\text{Output 174} = \frac{\begin{array}{c}(0.5 \times 0.6) \times (+1) + (0.5 \times 0.4) \times (0) + \\ (0.5 \times 0.6) \times (+1) + (0.5 \times 0.4) \times (0)\end{array}}{\begin{array}{c}(0.5 \times 0.6) + (0.5 \times 0.4) + \\ (0.5 \times 0.6) + (0.5 \times 0.4)\end{array}} = 0.6$$

wherein adapt_press is the weighted average of the four Rule consequences.

Stage time determined at step 128, is used as input to a calibrated function 175 relating stage time and a pressure adder. Function 175 produces as output the variable stage_adder, which is added to adapt_press at summing junction 176.

Each type of shift can occur with different conditions including various throttle positions, engine torques, temperatures, atmospheric pressures, engine speeds, turbine speeds, and vehicle speeds. All of these conditions affect the pressure requirements for a shifting event, especially the value of the throttle position. A higher throttle shift requires more initial shift pressure than does a lower throttle shift because engine torque into the transmission is higher. Also, the pressure requirements at higher engine speeds may be more or less than those at lower speeds. These pressures depend on centrifugal forces in rotating clutches as a function of turbine speed and inertia torques due to the change in engine speed during a shift.

The adaptive controller uses engine torque and turbine speed to map the shifting conditions as a speed versus load table in the Adaptive Pressure Matrix 108. The engine torque calculation is used because it takes into account both throttle position and atmospheric pressure conditions. The turbine-speed calculation is used because it represents the occurrence of a shift. With both torque and turbine speed as inputs, the speed versus load map is able to capture and differentiate between points on the transmission shift curve, FIG. 2. This mapping provides the adaptive system with the ability to distinguish between light throttle/high speed shifts, light throttle/low speed shifts, high throttle/high speed shifts, and high throttle/low speed shifts.

Any throttle position change that occurs during the transmission shift event is used as input to function 180, which relates a throttle position change, tp_change, and a variable tp adjust, which is carried to junction 182. The purpose of function 180 is to reduce the amount of adaptive pressure adjustment that occurs if a change in throttle position occurs during the gear ratio change. The variable tp_change is the absolute value of the number of counts corresponding to the current throttle position at the beginning of the gear ratio change minus the number of counts at the end of the gear ratio change.

The adaptive pressure produced as output at junction 182 is adapt_press=(adapt_press 174+stage_adder 175)×tp_adjust 180

The rule strengths and four rule consequences of the first fuzzy system, saved in KAM pressure matrix 108 and corresponding to tq_net and nt, are carried on line 184 to adaptive pressure change process 186, which determines the magnitude of pressure to be added to the four relevant cells of matrix 108. Also adapt_press output from junction 182 is used in step 186.

The process for calculating the adaptive pressure change includes six steps. The first step is to calculate an adaptive adjustment value called TERM_ADJ for each of the four rules from matrix 108

TERM_ADJ=STR_GAIN×ADAPT_STRENGTH[k]

The variable STR_GAIN 190 in the equation is an overall adaptive gain and a propagated gain at higher values. When the gain is set higher than unity, the adaptive pressure adjustment across the four cells is larger than the value of ADAPT_PRESS. If the gain is less than unity, then the pressure adjustment is less than ADAPT_PRESS. A gain of zero prevents all the cells in the matrix 108 from being modified. Preferably gain 190 is about 2.0.

The second step is to limit the value of TERM_ADJ with clipper 192 as follows

TERM_ADJ=min (TERM_ADJ, 1.0)

This prohibits any one of the four cells from being modified with a value larger than ADAPT_PRESS. The limiting process makes larger values of STR_GAIN act like a propagation gain rather than an overall gain when TERM_ADJ was clipped at 1.0. This is because the gain no longer has an effect on the cells limited to 1.0, but it still acts as a gain for those cells where TERM_ADJ is less than 1.0.

A third step is to calculate the value 194 that changes the cell by multiplying TERM_ADJ and ADAPT_PRESS

TERM_ADJ=TERM_ADJ×ADAPT_PRESS

Because TERM_ADJ is typically less than unity, each cell is only modified by a fraction of ADAPT_PRESS. TERM_ADJ could be calculated as an integer or a floating point number depending upon the form in which the rule consequences are stored in the matrix 103. In this case, TERM_ADJ is calculated as an integer.

A new rule consequence is created in the fourth step 196 by adding the adaptive adjustment value to the cells that require modification. A NEW_RULE variable is calculated with the addition of TERM_ADJ to the consequences of the four rules stored in ADAPT_RULES[ ]. The consequences NEW_RULE=ADAPT_RULE[k]+TERM_ADJ are stored in ADAPT_RULE[ ].

The process of limiting the new rule consequences 198 to a calibratable value is performed in the fifth step. The value in NEW_RULE is clipped to a minimum value (MIN_RULE) and a maximum value (MAX_RULE), which are constraints due to the system being controlled.

A final step in the adaptive routine stores the new rule consequence values in the knowledge base, for example, in the highlighted cells of Matrix 108. This was accomplished by replacing the previous rule consequences in matrix 108 with the new rule consequences 198. After the routine executes the four rules, the routine returns to the strategy with the adaptive process completed.

Example Adaptive Process

The following example describes the adaptive process from calculating the target_error 136 and determining adapt_press in the third fuzzy system to modifying adaptive pressure matrix 108.

The rules in this third fuzzy controller include: 1) If (slip time is very short) And (target ratio is small) Then (subtract a very large amount of pressure); 2) If (slip time is short) And (target ratio is small) Then (subtract a large amount of pressure); 3) of (slip time is long) And (target ratio is small) Then (subtract a small amount of pressure); 4) If (slip time is very long) And (target ratio is small) Then (add a medium amount of pressure); 5) If (slip time is very short) And (target ratio is medium) Then (subtract a large amount of pressure); 6) If (slip time is short) And (target ratio is medium) Then (subtract a small amount of pressure); 7) If (slip time is long) And (target ratio is medium) Then (add a small amount of pressure); 8) If (slip time is very long) And (target ratio is medium) Then (add a large amount of pressure); 9) If (slip time is very short) And (target ratio is large) Then (add a large amount of pressure); 10) If (slip time is short) And (target ratio is large) Then (add a large amount of pressure); 11) If (slip time is long) And (target ratio is large) Then (add a large amount of pressure); 12) If (slip time is very long) And (target ratio is large) Then (add a large amount of pressure).

The rules indicate that when the target ratio is small, the open-loop pressure calculation is above the desired level, causing an abrupt shift. When the target ratio value is medium, the slip time is used as the criteria for whether the shift was desirable. Finally, a large target ratio value indicates the open-loop pressure was low enough to cause a slip-bump in a shift with accumulators.

The adaptive pressure adjustment from the fuzzy controller is then increased if the stage time (time from solenoids switch to 10% to ratio change) is greater than a calibratable value. The adaptive pressure is also multiplied by a factor determined from the deviation in the throttle position reading for the shift event. Once the adaptive pressure is calculated, the adjustment is added to the KAM table for the turbine speed versus engine torque conditions.

Assume that the actual slip time for the shift is 1277 ms, and the desired shift time (slip_time_target 132) is 1027 ms. The corresponding target_error 136 equals −250 ms. The normalized error value (norm_et), calculated with a base of −300 ms and a span of 600 ms., equals 0.0833. This value, along with the previously fuzzified target_ratio value have the following memberships:

target_error is Negative Large(0.5) AND Negative Medium (0.5)

target_ratio is Low (0.6) AND Medium Low (0.4)

The four rule consequences corresponding to target_error 136 and the target_ratio are: add 4 psi, add 4 psi, add 6 psi, and add 6 psi of pressure. These rule consequences, represented by the shaded cells of matrix 140, result in the following four fuzzy rules:

| Rule A: | If target_error$_{NL}$(0.5) AND target_ratio$_L$(0.6), THEN add 4 |
|---|---|
| Rule B: | If target_error$_{NL}$(0.5) AND target_ratio$_{ML}$(0.4), THEN add 4 |
| Rule C: | If target_error$_{NM}$(0.5) AND target_ratio$_L$(0.6), THEN add 6 |
| Rule D: | If target_error$_{NM}$(0.5) AND target_ratio$_{ML}$(0.4), THEN add 6 |

These four rules are then evaluated in the inference engine to produce a rule strength for each rule. The four rule strengths and associated rule consequences are as follows:

| Rule A: | Rule Strength = 0.3 | Rule Consequence = 4 |
|---|---|---|
| Rule B: | Rule Strength = 0.2 | Rule Consequence = 4 |
| Rule C: | Rule Strength = 0.3 | Rule Consequence = 6 |
| Rule D: | Rule Strength = 0.2 | Rule Consequence = 6 |

These values are then defuzzified at 174 to produce adapt_press in terms of pressure:

$$\text{Adapt\_press} = \frac{(0.3 \times 4) + (0.2 \times 4) + (0.3 \times 6) + (0.2 \times 4)}{0.3 + 0.2 + 0.3 + 0.2} = 5 \text{ psi}$$

The adapt_press value 174 then enters the Adapt_Table routine along with the values stored in adapt_strength[ ] 188 and adapt_rule[ ] 194 from the first fuzzy system, from which adapt_poff is determined.

The values for adapt_strength[ ] 188 and adapt_rule[ ] 194 from the rules fired in the first fuzzy system example include:

| Rule A: | adapt_strength[0] = 0.42 | adapt_rule[0] = 4 psi |
|---|---|---|
| Rule B: | adapt_strength[1] = 0.28 | adapt_rule[1] = 0 psi |
| Rule C: | adapt_strength[2] = 0.18 | adapt_rule[2] = -2 psi |
| Rule D: | adapt_strength[3] = 0.12 | adapt_rule[3] = 6 psi |

At the adaptive pressure adjustment step 186, the rule strengths 188 are multiplied by adaptive gain str_gain 190, which equals 2.7 for this example. The results from the multiplication are then limited at 192 to a maximum value of unity. The following four results 196 for the new rule strengths are:

| Rule A: | min(0.42 × 2.7,1.0) = min(1.134,1.0) = 1.0 |
|---|---|
| Rule B: | min(0.28 × 2.,1.0) = min(0.756,1.0) = 0.756 |
| Rule C: | min(0.18 × 2.7,1.0) = min(0.486,1.0) = 0.486 |
| Rule D: | min(0.12 × 2.7,1.0) = min(0.324,1.0) = 0.324 |

These new rule strengths 196 are then multiplied by the value of adapt_press 5 psi. in this example) to give an integer value. These values correspond to the amount or pressure adjustment required for each cell in the Adaptive Pressure Matrix 108. The four values are given as the following:

| Rule A: | int (1.0 × 5) = +5 psi |
|---|---|
| Rule B: | int (0.756 × 5) = +4 psi |
| Rule C: | int (0.486 × 5) = +2 psi |
| Rule D: | int (0.324 × 5) = +2 psi |

These four values are then added to the saved rule consequence values stored in the adapt_rule[ ] array. The resulting new consequence values 198 include:

| Rule A: | 4 psi + 5 psi = 9 psi |
|---|---|
| Rule B: | 0 psi + 4 psi = 4 psi |
| Rule C: | -2 psi + 2 psi = 0 psi |
| Rule D: | 6 psi + 2 psi = 8 psi |

These new rule consequences are then limited to maximum and minimum pressure values for the system. The resulting new consequences are stored in their corresponding cells in adaptive pressure matrix 108 in KAM, which are subject to loss if the primary electrical power is lost or removed. The resulting new consequences can also be stored in pressure matrix 110 in ROM to retain them against loss in the event of electrical power failure or removal. If matrix 110 contains pressure values and matrix 108 contains only zero values, values from matrix 110 are used as input for the next gear ratio change to adapt friction element pressure. The friction element adaptive pressure adder is used by the microprocessor to produce an electric current magnitude that changes the magnitude of electric current applied to variable force solenoid 58 in order to change friction element pressure during the next gear ratio change.

This action completes the adaptive process for adjusting the friction element pressure before the next gear ratio change of the same type, such as a 1-2 upshift. The procedure is repeated for each subsequent gear ratio change and for each shift of a different type, such as upshifts (1-2, 2-3, 3-4), three downshifts (2-1, 3-2, 4-3), and four skip shifts (1-3, 2-4, 4-2, 3-1).

A desired response for the adaptive system is to adapt slowly the initial shift pressure to produce a desired shift time over a number of shifts. Additionally, once the desired shift time is achieved, the controller should maintain that shift time with no oscillation in the pressure adjustments.

The response and stability of the adaptive system is dictated by the resolution of the speed versus load rule table, the rules for adapting the pressure, and the adaptive gain. First, the speed versus load table determined the difference between shifting conditions. If the table is too small, then the conditions for a light throttle and a heavy throttle shift will mutually overlap. This causes oscillation in the pressure adjustment because a single condition in the table actually represents two different shifting conditions. If the table is too large, then too many possible shifting conditions will exist to make the system responsive. Next, the rules for adapting the pressure require a dead band when the target shift time is achieved. When the adaptive controller does not attain the target times, the rules correct the pressure in proportion to the shift time error. Finally, an adaptive gain is set at a value where the adaptive pressure adjustment occurs over a number of shifts, preventing the system from oscillating.

Preferably a number of criteria are used to determine whether to adapt a shift using the method of this invention. These criteria include: 1) the throttle position at the start of the shifting event does not deviate from the throttle at the end of the shift event by a calibratable amount; 2) power-on upshifts are only adapted while both power-on and coast downshifts are adapted; 3) a shift must occur a calibratable amount of time after a previous shift in order to adapt the shift; 4) a shift must occur a calibratable amount of time after a shift was commanded so that change-of-mind shifts are not adapted; the transmission fluid temperature must be above a calibrated temperature to allow shifts to be adapted. With these criteria met, only shifts with stable and repeatable torque, speed, and temperature conditions are adapted.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A method for changing the pressure produced by a pressure source and supplied to a friction element to be engaged to produce a gear ratio change in an automatic transmission adapted for use with an engine and a torque converter turbine, comprising the steps of:

determining current turbine speed and current engine torque at the start of a gear ratio change, and slope time and slip time during the gear ratio change;

determining an initial pressure adjustment corresponding to current turbine speed and current engine torque through use of a first fuzzy logic system having adaptive pressure adjustment values referenced to turbine speed and engine torque;

producing a gear ratio change by pressurizing the friction element from the pressure source at the pressure resulting from use of said initial pressure adjustment;

determining a slip time target corresponding to current turbine speed and current engine target through use of a second fuzzy logic system having acceptable slip time target values referenced to turbine speed and engine torque;

producing a target error as the difference between the slip time target and slip time;

producing a target ratio of the slip time and slip time target;

determining a pressure correction corresponding to target error and target ratio through use of a third fuzzy logic system having adaptive pressure values referenced to target error and target ratio;

producing corrected pressure adjustment values corresponding to current turbine speed and current engine torque using said pressure correction and adaptive pressure adjustment values;

replacing said adaptive pressure adjustment values of the first fuzzy logic system corresponding to current engine torque and turbine speed with the corrected adaptive pressure adjustment values; and producing a second gear ratio change by pressurizing the friction element from the pressure source at the pressure resulting through use of a first fuzzy logic system having said corrected adaptive pressure adjustment values.

2. The method of claim 1, wherein the step of determining an initial pressure adjustment through use of a first fuzzy logic system comprises determining rule strengths and rule consequences from the first fuzzy logic system corresponding to current engine torque and current turbine speed; and further comprising:

clipping said rule strengths to a predetermined maximum;

producing a first product by multiplying the rule strengths by said pressure correction;

producing corrected rule consequences by adding said first product to said rule consequences;

replacing said rule consequences with the respective corrected rule consequences; and producing a second gear ratio change by pressurizing the friction element from the pressure source at the pressure resulting from use of use of a first fuzzy logic system having said corrected rule consequences.

3. The method of claim 1, further comprising:

determining stage time during the gear ratio change;

producing a stage adder that is large if stage time is long and is relatively smaller if stage time is relatively shorter;

adding the stage adder to the pressure correction;

producing corrected pressure adjustment values corresponding to current turbine speed and current engine torque using said initial pressure adjustment values and sum of said pressure correction and stage adder;

replacing said initial pressure adjustment values with said corrected adaptive pressure adjustment values.

4. The method of claim 3, wherein the step of determining an initial pressure adjustment through use of a first fuzzy logic system comprises determining from the first fuzzy logic system the rule strengths and rule consequences corresponding to current engine torque and current turbine speed, further comprising:

clipping said rule strengths to a predetermined maximum;

producing a product by multiplying the rule strengths by said pressure correction;

producing corrected rule consequences by adding said product to said rule consequences;

replacing said rule consequences with the respective corrected rule consequences; and producing a second gear ratio change by pressurizing the friction element from the pressure source at the pressure resulting from use of a first fuzzy logic system having said corrected rule consequences.

5. The method of claim 3, further comprising:

determining the change in throttle position during the gear ratio change;

producing a throttle position adjustment factor that reduces the effect of the pressure correction if the change in throttle position is large;

adding the stage adder to the pressure correction;

producing a second product by multiplying the sum of the stage adder and said pressure correction;

producing corrected adaptive pressure adjustment values corresponding to current turbine speed and current engine torque using the second product;

replacing said initial pressure adjustment values with respective corrected adaptive pressure adjustment values.

6. The method of claim 5, wherein the step of determining an initial pressure adjustment through use of a first fuzzy logic system comprises determining from the first fuzzy logic system the rule strengths and rule consequences corresponding to the current engine torque and current turbine speed, further comprising:

clipping said rule strengths to a predetermined maximum limit;

producing a second product by multiplying the rule strengths by said pressure correction;

producing corrected rule consequences by adding said second product to said rule consequences;

replacing said rule consequences with the respective corrected rule consequences; and producing a second gear ratio change by pressurizing the friction element from the pressure source at the pressure resulting from use of a first fuzzy logic system having said corrected rule consequences.

7. A method for changing the pressure produced by a pressure source and supplied to a friction element to be engaged to produce a gear ratio change in an automatic transmission adapted for use with an engine and a torque converter turbine, comprising the steps of:

determining current turbine speed and current engine torque at the start of a gear ratio change;

determining the duration of a first portion of the gear ratio change;

determining the duration of a second portion of the gear ratio change;

determining an initial pressure adjustment corresponding to current turbine speed and current engine torque through use of a first fuzzy logic system having adaptive pressure adjustment values referenced to turbine speed and engine torque;

producing a gear ratio change by pressurizing the friction element from the pressure source at the pressure resulting from use of said initial pressure adjustment;

determining a first target for the duration of said first portion corresponding to current turbine speed and current engine target through use of a second fuzzy logic system having acceptable first target values for the duration of said first portion referenced to turbine speed and engine torque;

producing a target error as the difference between the first target for the duration of said first portion and the duration of said first portion;

producing a target ratio of the duration of said second portion time and duration of said first portion;

determining a pressure correction corresponding to target error and target ratio through use of a third fuzzy logic system having adaptive pressure values referenced to target error and target ratio;

producing corrected pressure adjustment values corresponding to current turbine speed and current engine torque using said pressure correction and adaptive pressure adjustment values;

replacing said adaptive pressure adjustment values of the first fuzzy logic system corresponding to current engine torque and turbine speed with the corrected adaptive pressure adjustment values; and producing a second gear ratio change by pressurizing the friction element from the pressure source at the pressure resulting through use of a first fuzzy logic system having said corrected adaptive pressure adjustment values.

8. The method of claim 7, wherein the step of determining an initial pressure adjustment through use of a first fuzzy logic system comprises determining rule strengths and rule consequences from the first fuzzy logic system corresponding to current engine torque and current turbine speed; and further comprising:

clipping said rule strengths to a predetermined maximum;

producing a first product by multiplying the rule strengths by said pressure correction;

producing corrected rule consequences by adding said first product to said rule consequences;

replacing said rule consequences with the respective corrected rule consequences; and producing a second gear ratio change by pressurizing the friction element from the pressure source at the pressure resulting from use of use of a first fuzzy logic system having said corrected rule consequences.

9. The method of claim 7, further comprising:

determining the duration of a third portion of the gear ratio change;

producing a stage adder that is large if the duration of said third portion is long and is relatively smaller if large if the duration of said third portion is relatively shorter;

adding the stage adder to the pressure correction;

producing corrected pressure adjustment values corresponding to current turbine speed and current engine torque using said initial pressure adjustment values and sum of said pressure correction and stage adder;

replacing said initial pressure adjustment values with said corrected adaptive pressure adjustment values.

10. The method of claim 9, wherein the step of determining an initial pressure adjustment through use of a first fuzzy logic system comprises determining from the first fuzzy logic system the rule strengths and rule consequences corresponding to current engine torque and current turbine speed, further comprising:

clipping said rule strengths to a predetermined maximum;

producing a product by multiplying the rule strengths by said pressure correction;

producing corrected rule consequences by adding said product to said rule consequences;

replacing said rule consequences with the respective corrected rule consequences; and producing a second gear ratio change by pressurizing the friction element from the pressure source at the pressure resulting from use of a first fuzzy logic system having said corrected rule consequences.

11. The method of claim 9, further comprising:

determining the change in throttle position during the gear ratio change;

producing a throttle position adjustment factor that reduces the effect of the pressure correction if the change in throttle position is large;

adding the stage adder to the pressure correction;

producing a second product by multiplying the sum of the stage adder and said pressure correction;

producing corrected adaptive pressure adjustment values corresponding to current turbine speed and current engine torque using the second product;

replacing said initial pressure adjustment values with respective corrected adaptive pressure adjustment values.

12. The method of claim 11, wherein the step of determining an initial pressure adjustment through use of a first fuzzy logic system comprises determining from the first fuzzy logic system the rule strengths and rule consequences corresponding to the current engine torque and current turbine speed, further comprising:

clipping said rule strengths to a predetermined maximum limit;

producing a second product by multiplying the rule strengths by said pressure correction;

producing corrected rule consequences by adding said second product to said rule consequences;

replacing said rule consequences with the respective corrected rule consequences; and producing a second gear ratio change by pressurizing the friction element from the pressure source at the pressure resulting from use of a first fuzzy logic system having said corrected rule consequences.

* * * * *